(12) United States Patent
Leon Camacho

(10) Patent No.: US 12,527,815 B2
(45) Date of Patent: Jan. 20, 2026

(54) AQUEOUS FORMULATION INCLUDING DISSOLVED HYDROGEN GAS AND MINERALS AND ADDITIVES

(71) Applicant: BEST PLANET SCIENCE LLC, Wilmington, DE (US)

(72) Inventor: Tatiana Svetlana Leon Camacho, Bogotá (CO)

(73) Assignee: BEST PLANET SCIENCE LLC, Wilmington, DE (US)

( * ) Notice: Subject to any disclaimer, the term of this patent is extended or adjusted under 35 U.S.C. 154(b) by 0 days.

(21) Appl. No.: 18/100,563

(22) Filed: Jan. 23, 2023

(65) Prior Publication Data
US 2024/0261321 A1    Aug. 8, 2024

(51) Int. Cl.
| | | |
|---|---|---|
| *A61K 33/00* | (2006.01) |
| *A23L 2/54* | (2006.01) |
| *A23L 33/15* | (2016.01) |
| *A23L 33/16* | (2016.01) |
| *A23L 33/175* | (2016.01) |
| *A61K 9/00* | (2006.01) |
| *A61K 31/198* | (2006.01) |
| *A61K 31/4188* | (2006.01) |
| *A61K 31/4415* | (2006.01) |
| *A61K 31/51* | (2006.01) |
| *A61K 31/519* | (2006.01) |
| *A61K 31/525* | (2006.01) |
| *A61K 31/714* | (2006.01) |
| *A61K 33/04* | (2006.01) |
| *A61K 33/06* | (2006.01) |
| *A61K 33/26* | (2006.01) |
| *A61K 33/30* | (2006.01) |
| *A61K 33/34* | (2006.01) |
| *C02F 1/68* | (2023.01) |

(52) U.S. Cl.
CPC ............... *A61K 33/00* (2013.01); *A23L 2/54* (2013.01); *A23L 33/15* (2016.08); *A23L 33/16* (2016.08); *A23L 33/175* (2016.08); *A61K 9/0095* (2013.01); *A61K 31/198* (2013.01); *A61K 31/4188* (2013.01); *A61K 31/4415* (2013.01); *A61K 31/51* (2013.01); *A61K 31/519* (2013.01); *A61K 31/525* (2013.01); *A61K 31/714* (2013.01); *A61K 33/04* (2013.01); *A61K 33/06* (2013.01); *A61K 33/26* (2013.01); *A61K 33/30* (2013.01); *A61K 33/34* (2013.01); *C02F 1/68* (2013.01)

(58) Field of Classification Search
CPC .... A61K 33/00; A61K 9/0095; A61K 31/198; A61K 31/4188; A61K 31/4415; A61K 31/51; A61K 31/519; A61K 31/525; A61K 31/714; A61K 33/04; A61K 33/06; A61K 33/26; A61K 33/30; A61K 33/34; A23L 2/54; A23L 33/15; A23L 33/16; A23L 33/175; C02F 1/68
See application file for complete search history.

(56) References Cited

U.S. PATENT DOCUMENTS

| | | |
|---|---|---|
| 4,969,991 A | 11/1990 | Valadez |
| 5,494,538 A | 2/1996 | Kirillov et al. |
| 6,797,165 B2 | 9/2004 | Harrison |
| 7,090,878 B2 | 8/2006 | Mehansho et al. |
| 7,799,363 B2 | 9/2010 | Sherwood et al. |
| 7,897,192 B2 | 3/2011 | Sherwood et al. |
| 8,383,688 B2 | 2/2013 | Lo et al. |
| 8,968,568 B2 | 3/2015 | Armour |
| 9,351,517 B2 | 5/2016 | Bromley |
| 10,849,339 B2 | 12/2020 | Prakash et al. |
| 11,224,239 B2 | 1/2022 | Murray |
| 2004/0096547 A1 | 5/2004 | Ferruzzi |
| 2005/0121399 A1 | 6/2005 | Hayashi et al. |
| 2005/0202146 A1 | 9/2005 | Anantharaman et al. |
| 2008/0226566 A1 | 9/2008 | Poth et al. |
| 2009/0186128 A1* | 7/2009 | Banayan ............ A23F 3/34 426/597 |
| 2016/0249668 A1 | 9/2016 | Igarashi |
| 2018/0029913 A1 | 2/2018 | Ng |
| 2019/0225521 A1 | 7/2019 | Heath |
| 2021/0214248 A1 | 7/2021 | Echeverry Campos |

FOREIGN PATENT DOCUMENTS

| | | |
|---|---|---|
| AU | 2003218893 A1 | 10/2003 |
| AU | 2009297493 A1 | 4/2010 |
| AU | 2018202660 A1 | 5/2018 |

(Continued)

OTHER PUBLICATIONS

Lozynski, Liquid water: The helical perspective of structure, Chemical Physics 455 (2015) 1-6 (Year: 2015).*
Allen et al., A Theory of Anomalous Water, Science, Mar. 13, 1970, vol. 167, No. 3924 (Year: 1970).*
Byju, What is the Density of Water?—Factors, Experiment, Temperature Scales, FAQs, https://byjus.com/physics/density-of-water/ (Year: 2023).*
Lippincott et al., Polywater, Science, vol. 164, 3887, p. 1482-1487, published Jun. 27, 1969 (Year: 1969).*
BYJU_2, What is Refractive Index-Refractive index of water, examples and formula, https://byjus.com/physics/refractive-index/ (Year: 2023).*

(Continued)

*Primary Examiner* — Anna R Falkowitz
*Assistant Examiner* — Edwin Coleman Mitchell
(74) *Attorney, Agent, or Firm* — Bryan Cave Leighton Paisner LLP

(57) ABSTRACT

An aqueous formulation including a three-dimensional helical cage structure of polygonal water molecules, wherein the polygonal water molecules include two or more adjacent water molecules connected by hydrogen bridges, the helical cage structure has a central hollow lumen, and when viewed from a top, the helical cage structure has a hexagonal shape. The aqueous formulation also includes molecular hydrogen and at least one additive located within the central hollow lumen of the helical structure.

8 Claims, 6 Drawing Sheets

(56) References Cited

FOREIGN PATENT DOCUMENTS

| | | |
|---|---|---|
| CA | 2493066 A1 | 1/2004 |
| CA | 2850550 A1 | 4/2013 |
| CA | 2963964 A | 10/2018 |
| CN | 102551141 A | 7/2012 |
| CN | 105105256 A | 12/2015 |
| CN | 107265723 A | 10/2017 |
| CN | 107445386 A | 12/2017 |
| CN | 107651789 A | 2/2018 |
| CN | 108164077 A | 6/2018 |
| CN | 112321063 A | 2/2021 |
| CN | 112429894 A | 3/2021 |
| DE | 3630523 A1 | 4/1987 |
| DE | 3912498 A1 | 4/1989 |
| DE | 29805105 U1 | 5/1998 |
| EP | 2510801 A1 | 10/2012 |
| EP | 2814332 A1 | 12/2014 |
| ES | 2456704 T3 | 4/2014 |
| ES | 2609654 T3 | 4/2017 |
| ES | 2837457 T3 | 6/2021 |
| JP | 4653945 B2 | 3/2011 |
| KR | 102314002 A | 6/2019 |
| WO | 2009/115064 A1 | 9/2009 |
| WO | 2010005276 A1 | 1/2010 |
| WO | 2011139019 A2 | 11/2011 |
| WO | 2013044929 A1 | 4/2013 |
| WO | 2014/053865 A1 | 4/2014 |
| WO | WO-2017177823 A1 * | 10/2017 |
| WO | 2022/107113 A2 | 5/2022 |
| WO | 2022/107113 A3 | 5/2022 |

OTHER PUBLICATIONS

Ortho Blog, Does Kombucha Help Your Joints?, https://web.archive.org/web/20220819201748/https://osamds.com/kombucha-help-joints/# (Year: 2022).*

Kuo et al., "Short H-bonds and spontaneous self-dissociation in $(H_2O)_{20}$: Effects of H-bond topology," Journal of Chemical Physics, 118(8) (2003), pp. 3583-3588.

G.H. Pollack, "The role of aqueous interfaces in the cell," Advances in Colloid and Interface Science, 103 (2003), pp. 173-196.

Hwang et al., "Exclusion zone and heterogeneous water structure at ambient temperature," PLoS One, 13(4) (3028), 27 pages.

Ozonek et al., "Effect of different design features of the reactor on hydrodynamic cavitation process," Archives of Materials Science and Engineering, 52(2) (2011), pp. 112-117.

Kajiya et al., "Hydrogen from intestinal bacteria is protective for Concanavalin A-induced hepatitis, " Biochem. Biophys. Res. Commun., 386 (2) (2009), pp. 316-321.

Shetty et al., (2020), "A comparative study of hydrogen generation by reaction of ball milled mixture of magnesium powder with two water-soluble salts (NaCl and KCl) in hot water" International Journal of Hydrogen Energy, vol. 45, Issue 48, pp. 25890-25899.

* cited by examiner

| | Representation of the hydrogen atoms |
|---|---|
| | Representation of oxygen atoms |

| | Representation of the hydrogen atoms |
|---|---|
| | Representation of oxygen atoms |

| Sphere | Representation of |
|---|---|
| | Hydrogen atoms |
| | Carbon atoms |
| | Calcium atom |
| | Oxygen atoms |

| Sphere | Representation of |
|---|---|
| | Hydrogen atoms |
| | Carbon atoms |
| | Calcium atom |
| | Oxygen atoms |

AQUEOUS FORMULATION INCLUDING DISSOLVED HYDROGEN GAS AND MINERALS AND ADDITIVES

CROSS-REFERENCE TO RELATED APPLICATION

The present application is related to US application titled WATER DISPENSING DEVICE, which is filed concurrently herewith on Jan. 23, 2023 and has been assigned application Ser. No. 18/100,562, the contents of which are incorporated by reference in their entirety as if fully set forth herein, and which is referred to in this application as "the co-pending application".

TECHNICAL FIELD

The present application is directed to an aqueous formulation including a 3-D helical structure of polygonal water molecules having a hollow lumen, with dissolved hydrogen gas, minerals and additives, and the preparation of the aqueous formulation. The aqueous formulation of the present application has long-term stability whereby the concentration of dissolved hydrogen gas in the aqueous formulation is maintained over time.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions, or is known to be relevant to an attempt to solve any problem with which this specification is concerned.

Water is a fundamental factor in the development of living cells, and characteristics and properties of water facilitate the transport of nutrients to the cell membrane. The characteristics and properties of water can be improved by including dilute gases, such as oxygen, carbon dioxide, nitrogen and hydrogen. Of these, there has been increasing interest in the development of water containing dissolved hydrogen.

Molecular hydrogen ($H_2$) is the lightest chemical element in the universe. This property lets hydrogen diffuse into every structure of the human body without any support. Thus, hydrogen can enter any cell just by diffusing through it, and without the need to be combined with any other elements or compounds or for additional carriers to aid in the diffusion process. That is why the most important actions of hydrogen's metabolic function are performed at the intracellular level.

Consumption of water with dissolved hydrogen stimulates natural anti-inflammatory phenomena that are necessary to complete the natural repair cycle during the inflammation process. Inflammation is a process that, in an initial stage, serves to repair damaged structures. The initial stage is followed by subsequent anti-inflammatory action to complete the repair cycle. However, in some cases (such as in the case of most modern diseases), a permanent inflammatory stimulation remains as a pathophysiological phenomenon that prevents completion of the natural repair cycle during the inflammation process. Consumption of hydrogen induces an anti-inflammatory effect by stimulating specific families of lymphocytes, regulating adhesion molecules, and stimulating the growth of cellular families to address deficiencies caused by an incomplete repair cycle.

Another benefit of consuming water with dissolved hydrogen is that it stimulates the formation of more than two hundred natural antioxidant systems in the human body that prevent cellular damage caused by oxidative stress of oxygen radicals that deteriorates cellular membranes and organelles, and alters DNA. The ability of hydrogen to diffuse into cells without a carrier stimulates the aforementioned formation of antioxidants. Thus, hydrogen dissolved in water is able to act directly on the metabolic pathway of the formation of natural antioxidants, as well as indirectly by promoting metabolic pathways that prevent this alteration.

As an additional function, hydrogen participates in the regulation of cell growth and natural cell death, which makes it an important component of the process of regulating tumor growth and cancer pathology. Many of its functions are still new in the world of medicine and are pending exploration in diverse medical areas. Nevertheless, preliminarily studies have already generated good results in regenerative medicine, sports medicine, muscle performance and against metabolic diseases.

Molecular hydrogen ($H_2$) has been investigated in many areas due to the above-discussed properties. Two of these areas include: energy, i.e., using molecular hydrogen as an important vector for storage and distribution of energy; and the beneficial medicinal properties of molecular hydrogen for improving quality of life. For this reason, hydrogen is considered a source of clean energy and a vector of human health. Different experiments have been carried out by the scientific community, which show that water with dissolved molecular hydrogen provides many benefits for human beings at the cellular level, including improvements to many systems of the human body. Molecular hydrogen has also been the subject of clinical studies that demonstrate the anti-apoptotic, anti-inflammatory, antioxidant and other protective effects of water with hydrogen, as well as its important role in the immune system.

Inside the human body, hydrogen is produced naturally from digestion of fibers by intestinal flora. A study of the University of Florida and the Forsythe Institute in Boston, Massachusetts, confirmed the therapeutical effects of hydrogen produced from bacteria. This study concluded that the reconstruction of the intestine's microbiota with hydrogen-producing E. coli was protective against hepatitis induced by A. Concanvalin (M. Kajiya, K. Sato, M. J. Silva, K. Ouhara, P. M. Do, K. T. Shanmugam, T. Kawai Hydrogen from intestinal bacteria is protective for Concanavalin A-induced hepatitis Biochem. Biophys. Res. Commun., 386 (2) (2009), pp. 316-321.). It has also been shown that hydrogen produced by bacteria from acarbose administration is therapeutic. Perhaps this explains the significant reductions in cardiovascular events in patients that have taken the hydrogen-producing acarbose (Tamasawa, A., Mochizuki, K., Hariya, N., Saito, M., Ishida, H., Doguchi, S., . . . Osonoi, T. (2015). Hydrogen gas production is associated with reduced inter-leukin-1β mRNA in peripheral blood after a single dose of acarbose in Japanese type 2 diabetic patients. European Journal of Pharmacology, 762, 96-101. doi:10.1016/j.ejphar.2015.04.051).

These studies not only suggest the therapeutic action of molecular hydrogen, but also demonstrate that it is safe for human consumption (i.e., it has a high safety profile). Hydrogen exposure is very natural to the human body because it is exposed to hydrogen daily from normal bacterial metabolism.

In addition, hydrogen gas has been used in deep-sea diving since the 1940s to prevent decompression sickness. Hundreds of studies in humans for deep-sea diving have shown that inhaling hydrogen gas in a greater order of magnitude than normal therapeutic use is well tolerated by the human body without chronic toxic effects. Such studies on hydrogen related to bacterial production, deep-sea diving, and recent medical applications have not revealed any harmful side effects of hydrogen administration at biologically therapeutic levels.

Said safety profile of hydrogen can be considered paradoxical because the chemotherapeutic agents that induce biological effects should have both beneficial and harmful effects depending on the dose, timing, location, duration, etc. However, harmful effects have not been reported as yet for hydrogen. Perhaps, the harmful effects of ingesting molecular hydrogen are very transient and mild, and they are obscured by the beneficial effects or any potential harmful effects are mediated by the beneficial effects through a hormetic phenomenon.

A problem with hydrogen dissolved in water is that it is quickly lost to the atmosphere, which is the reason most water brands on the market have a low concentration of dissolved hydrogen in amounts of about 10 parts to 2,000 parts per billion, and such dissolved hydrogen is easily lost to the environment.

A water molecule is generally denoted by the formula $H_2O$. However, because of the nature of the $H_2O$ molecular and the possibility of forming hydrogen bridges, various different structures can be formed under appropriate pressure and temperature conditions, such as semi-structures of $H_3O_2$ in liquid form. Semi-structures are formations of hydrogen bridges and weak bonds within a fluid, which are capable of changing the properties of the fluid. In recent years, much progress has been made in understanding the relationship between the structure of $H_3O_2$ and its physicochemical properties. However, these studies have mainly focused on the surface of common water and interaction of the surface water molecules with gels having biological characteristics.

The structure and growth of planar structures of water at different interface have been studied earlier. These previous studies are related to natural hydrogen bridge interactions in a particular zone, and do not include any external energy forces applied thereto. The interaction of adjacent water molecules through hydrogen-bonding is comparable to or stronger than the interaction between water and a substrate.

It is important to note the formation of different structures of water molecules on calcium, magnesium, iron, zinc, copper and selenium atoms in their aqueous form at a temperature around 4° C., in particular, how these atoms diffuse and aggregate based on their electromagnetism to form clusters, monolayers and multilayers of water molecules on these elements.

$H_2$ Bonds

Hydrogen bridging is an electrostatic force between an electronegative atom or molecule and a hydrogen atom. Energy of such hydrogen bridging is lower than the energy of a conventional covalent bond by about 5 kJ/mol to 30 kJ/mol. However, the nature of these hydrogen bonds is such that twenty water molecules can be arranged in as many as 30,026 different forms of dodecahedral cage symmetry (Jer-Lai Kuo et. al. (Short H-bonds and spontaneous self-dissociation in $(H_2O)20$: Effects of H-bond topology Jer-Lai Kuo, Cristian V. Ciobanu, Lars Ojama¨ e, Isaiah Shavitt and Sherwin J. Singer, Journal of Chemical Physics, Volume 118, Number 8, 22 Feb. 2003, Doi: 10.1063/1.1538240).

Structured Water and the $H_3O_2$ Molecule

The formation of "structured water", or the $H_3O_2$ molecule, requires a relatively low temperature around 4° C. and pressures close to atmospheric pressure. The arrangement of $H_2O$ molecules at or around 4° C. is ideal for the formation of $H_3O_2$ molecules because the density of $H_2O$ is highest at this temperature. At higher temperatures, the hydrogen bond interactions are not sufficient to maintain a matrix of $H_2O$ molecules that facilitates the formation of $H_3O_2$. Therefore, it is necessary to limit the environmental conditions to which the molecules are exposed to promote molecular structural formation in the aqueous medium. At high density, the water structure is similar to a cell, and this structure is not sensitive to changes in physical properties such as surface tension, density and specific heat. Once water molecules in close proximity collide with each other, they can form strong hydrogen bonds that are substantially as strong as water-substrate bonds.

Studies with other surface-sensitive techniques, such as X-ray photoelectron spectroscopy (XPS), X-ray absorption spectroscopy (XAS), X-ray emission spectroscopy (XES), infrared reflection absorption spectroscopy (IRAS), Raman spectroscopy, aggregate frequency generation (SFG), and crystallographic techniques, such as low-energy electron diffraction (LEED), grazing X-ray diffraction, and the like, have also provided additional information regarding the interaction between adjacent water molecules.

Although these techniques are, in general, capable of identifying the presence of small $H_3O_2$-forming water matrices, it is difficult from these data to conclusively deduce the aggregation state of the molecules, as these techniques obtain the average number of $H_3O_2$ molecules over large areas of the surface, which likely contain a wide variety of cluster sizes, as well as staggered zones and surface defects. It was not until the advent of scanning tunneling microscopy (STM) that water formations and their diffusion and aggregation on metal surfaces could be studied more reliably.

With these techniques, it was observed that the optimal geometry is one in which the plane of the water molecule is almost parallel to the surface ("Molecular Structure of Water at Interfaces: Wetting at the Nanometer Scale, Chemical Reviews", A. Verdaguer, G. M. Sacha, H. Bluhm, and M. Salmeron, 2006 106 (4), 1478-1510, DOI: 10.1021/cr0403761 (Verdaguer et al. 2006)).

Adsorption energies of water vary between 0.1 and 0.4 eV, which is on the order of the energy of a hydrogen bond (~0.25 eV). Adsorption energy depends on the metal and was found to be classified in the order Au<Ag<Cu<Pd<Pt<Ru<Rh, reflecting the strength of the oxygen-metal bond (A. Verdaguer et al, 2006). Thus, even if an orientation is not energetically the most favorable to form a given structure, it could give rise to a stable group of structures due to hydrogen bond formation (A. Verdaguer et al, 2006).

The structured water matrix retains the solvent (water) even after dismemberment of the cell. ("The role of aqueous interfaces in the cell, Advances in Colloid and Interface Science", Pollack G. H., 103 (2003) 173-196 (Pollack 2003).) Muscle cells behave similarly to gels at this point. As a consequence, the cytoplasm closely resembles an ordinary gel (Pollack 2003). Pollack 2003 also explains the mechanisms of water retention and poses two hypotheses: (1.) the mechanistic retention of water and relationship with the osmotic pressure; and (2.) the attraction of water dipoles to charged surfaces to form multilayers. Further discussion of the formation of multilayer water structures are described in Pollack 2003; "Surface forces in adsorbed multilayers of water on quartz", R. M. Pashley, J. A. Kitchener, J. Colloid Interface Sci. 71 (1979) 491-500 (Pashley 1979); and "Role of hydration and water structure in biological and colloidal interactions", J. N. Israelachvili, H. Wennerström, Nature 379 (1996) 219-225 (Israelachvili 1996). For example, Pashley 1979 and Israelachvili 1996 describe methods of measuring the force needed to displace interspersed solvents between widely-spaced parallel microsurfaces.

Hwang et al. proposes a heterogeneous structure of water, where water includes two types of structures based on its density ("Exclusion zone and heterogeneous water structure at ambient temperature", Hwang S G, Hong J K, Sharma A, Pollack G H, Bahng G, 2018 (Hwang et al. 2018).

Other examples of structural formations on metals in aqueous media are described in acidic media (pH<2.8) with transition metals such as scandium ("$H_3O_2$ Bridging Ligand in a Metal-Organic Framework. Insight into the Aqua-Hydroxo-Hydroxyl Equilibrium: A Combined Experimental and Theoretical Study", Richard F. D'Vries, Victor A. de la Peña-O'Shea, Natalia Snejko, et al, Journal of the American Chemical Society, American Chemical Society, Apr. 1, 2013 (D'Vries 2013)). D'Vries 2013 concludes that the stabilization of this species in a stable MOF material (metal-organic framework) opens a new field of study with new properties, including proton conductivity (where the proton is located in the center of the channels), the separation of water, enzymatic reactions, and the transfer of hydrogen atoms through hydrogen bridges.

There are various conventional formulations that include water products for human consumption (i.e., for ingestion) that can include hydrogen, such as those described in CN 105105256, US 2005/0121399, US 2016/0249668, WO 2017/177823, U.S. Pat. No. 11,224,239, US 2008/0226566, U.S. Pat. No. 7,090,878, AU 2003218893, JP 4653945, US 2004/0096547, U.S. Pat. Nos. 7,799,363, 7,897,192, 9,351, 517, AU 2018202660, CA 2 493 066, AU 2009297493, CN 10255114, EP 2 510 801, EP 2 8143 32, ES 2 456 704, ES 2 609 654, CA 2 850 550, KR 10-2314002, U.S. Pat. No. 10,849,339 and US 2005/0202146.

CN105105256A describes a hydrogen-enriched health beverage that contains drinking water, with added hydrogen and water soluble plant extracts containing natural small molecular group substances.

US20160249668 describes a hydrogen-containing drink containing a functional ingredient such as tea and hydrogen water. The functional ingredient is selected from teas; fruits, vegetables, and plants; sugars and sweeteners; polyphenols; vitamins and coenzymes; amino acids and proteins; oxidoreductases; citric acids; and yeast extracts and polydextroses, and are blended with hydrogen water. The hydrogen-containing drink is prepared by: degassing water as a raw material, dissolving hydrogen gas in the degassed water through a gas-permeable hollow fiber membrane to produce hydrogen water, and dissolving or mixing the functional ingredient in the produced hydrogen water, or dissolving or mixing the functional ingredient in water as a raw material, degassing the obtained solution or mixture, and dissolving hydrogen gas in the degassed solution or mixture through a gas-permeable hollow fiber membrane.

WO2017177823 describes a hydrogen-containing beverage and a preparation method therefor. The hydrogen-containing beverage comprises drinking water, hydrogen, and plant solids. The mass concentration of hydrogen is 0.01 ppm to 6 ppm, the plant solids are insoluble matters dispersed in the hydrogen-containing beverage, and the mass ratio of the plant solids ranges from 0.1% to 15%. The preparation method comprises: selecting one or more of the following plants: nuts, beans, fruits, vegetables, grains and edible Chinese herbal medicines; adding hydrogen or hydride into the drinking water to obtain hydrogen-containing water; and placing the selected one or more plants into the hydrogen-containing water, and grinding to obtain the hydrogen-containing beverage.

U.S. Pat. No. 11,224,239 describes a process of producing hydrogen water including the steps of: cooling water to a temperature at which the hydrogen atoms of the water molecule expand to create a space between these atoms and bringing the cooled water into contact with gaseous hydrogen, and then heating the water to trap the gaseous hydrogen in the space created by the expanded hydrogen atoms of the water molecule. The hydrogen water has a hydrogen content of from 3 parts per million to 10 parts per million. The hydrogen water may be filled in pouches with the hydrogen water in the pouch having a hydrogen content of 1.7 parts per million to 4 parts per million.

US Publication No. 2008/0226566 describes the use of a composition containing at least one not easily water-soluble calcium salt and/or a composite material thereof, to protect and/or therapeutically treat and/or preventively treat teeth and/or bones in case of damage or prevent damage resulting from external influences, especially biological, chemical, physical, and/or microbiological influences, particularly to prevent and repair bone and tooth erosion, especially the enamel, maintain the enamel, protect teeth from aggressive acids, particularly caused by bacterial activity or the effect of acids contained in food, protect teeth from demineralizing, seal cracks, provide protection against and/or repair primary lesions and/or initial cavities in the enamel, smooth the tooth surface, prevent cavities make it easier to clean teeth, improve the mechanical resistance of teeth, and generally keep teeth healthy.

U.S. Pat. No. 7,090,878 describes a water composition that is fortified with at least one mineral and has a pH between about 2.5 and 9.5. The water composition has a redox potential that satisfies the following equation: 0≥RP−(A−B*pH) wherein RP is the redox potential in millivolts of the mineral-containing water composition, pH is the pH of the mineral-containing water composition, A is 400 and B is 20. The mineral is preferably selected from calcium, iron, zinc, copper, manganese, iodine, magnesium, and mixtures thereof. Moreover, the mineral-fortified water composition is preferably substantially free of flavor or sweetener compounds. Even more preferably, the water composition has no metallic taste or after-taste, a Hunter colorimetric "b" reading of less than 5.0, and an NTU turbidity value of less than 5.0. The mineral-fortified water composition may optionally contain other nutrients and vitamins, for example, vitamin A, vitamin C, vitamin E, niacin, thiamin, vitamin B6, vitamin B2, vitamin B 12, folic acid, selenium, and pantothenic acid.

AU 2003218893 describes a manufactured mineral water made from biologically acceptable soluble salts of four different groups which may be made separately. Group A elements consist of calcium at a final concentration of between 25 and 82 mg/L and magnesium at a final concentration of between 6 and 18 mg/L. Group B elements consist of phosphorus at a final concentration of between 15 and 80 mg/L, potassium at a final concentration of between 50 and 180 mg/L, silicon at a final concentration of between 0.45 to 1.5 mg/L, sodium at a final concentration of between 3 and 30 mg/L, and chlorine at a final concentration of between 3 and 28 mg/L. Group C elements consist of boron at a final concentration of between 0 and 60 μg/L, chromium at a final concentration of between 0 and 0.5 μg/L, cobalt at a final concentration of between 0 and 0.5 μg/L, copper at a final concentration of between 0 and 12 μg/L, iodine at a final concentration of between 0 and 6 μg/L, lithium at a final concentration of between 0 and 1.5 μg/L, manganese at a final concentration of between 0 and 1.5 μg/L, molybdenum at a final concentration of between 0 and 1.5 μg/L, nickel at a final concentration of between 0 and 0.5 g/L, selenium at a final concentration of between 0 and 100 μg/L, tin at a final concentration of between 0 and 1.5 μg/L, vanadium at a final concentration of between 0 and 0.1 μg/L and zinc at a final concentration of between 0 and 100 μg/L. Group D consists of iron at a final concentration of between 0 and 20 μg/L. The pH is preferably adjusted to a final value of between 6.6 to 8.0 for still water or a final value of between 2.5 to 8.0 for aerated or carbonated water.

JP 4653945 describes pharmacologically functional water that contains, as an active ingredient, an antioxidant water comprising hydrogen-dissolved water and a precious-metal colloid. Here, the hydrogen-dissolved water contains hydrogen molecules serving as substrates in raw water, and the precious-metal colloid is contained in the hydrogen-dissolved water and catalyzes a reaction which decomposes the hydrogen molecules into hydrogen atoms as a product. The pharmacologically functional water exerts the pharmacological function without any side effects and is used for prophylaxis and/or treatment of diseases.

US Publication No. 20040096547 describes a natural energy drink which provides onset and steady maintenance of energy, mental alertness and nutrition to the consumer, as well as kits comprising the compositions and methods of using the compositions. In particular, the natural energy drink of this reference includes one or more disaccharides, one or more carbohydrate complexes, one or more proteins, one or more stimulants and a vitamin premix which includes at least three vitamins. The natural energy drink may optionally, but preferably, include one or more, flavanols, acidulants, coloring agents, minerals, soluble fibers, non-caloric sweeteners, flavoring agents, preservatives, emulsifiers, oils, carbonation components, and the like, to enhance, for example, its performance in providing energy, mental alertness, organoleptic properties, and nutritional profile.

U.S. Pat. No. 7,799,363 describes a protein beverage that may provide a relatively high protein content, ranging from about 0.01% by weight to about 15% by weight, while optionally employing a carbonation concentration between about 0.1 volumes of carbonation (per volume of liquid drink) to about 6 volumes of carbonation. Preferably the protein is a whey protein, or others. The protein beverage may contain juice and/or an additive which provides energy generation enhancement. The protein beverage may be heat treated to inactivate pathogenic microbes in the presence of the carbonation, which may be used to provide taste and mouth feel for the drink. Typically, the treatment for pathogenic microbe inactivation is carried out in the individual package used for storage and handling of the protein drink. The protein beverage may be prepared from a protein beverage concentrate, which may be in the form of a syrup concentrate or a powder concentrate.

U.S. Pat. No. 7,897,192 describes a carbonated protein beverage/drink composition that provides a relatively high protein content, ranging from about 2% by weight to about 15% by weight, while simultaneously employing a carbonation concentration between about 0.1 volumes of carbonation (per volume of liquid drink solution or liquid drink suspension) to about 4 volumes of carbonation. The preferred protein is whey protein. The carbonated protein beverage may contain an additive which enhances energy generation. The carbonated protein beverage is heat treated to inactivate microbes in the presence of the carbonation. Typically, the treatment for microbe inactivation is carried out in the individual package used for storage and handling of the carbonated protein drink.

U.S. Pat. No. 9,351,517 describes compositions that contain water-soluble vitamin E derivative mixtures (compositions), such as tocopherol polyethylene glycol succinate (TPGS), TPGS analogs, TPGS homologs and TPGS derivatives. The water-soluble vitamin E mixtures contain mixtures that include dimers and monomers of the vitamin E derivative, where the amount of dimer is greater than 12%, such as 29%, 35%, 50%, 60%, and the amount of monomer is less than 87% by weight of the water-soluble vitamin E derivative mixture. Also provided are products containing the water-soluble vitamin E derivative mixtures, including concentrates for dilution into aqueous beverages and compositions for direct ingestion.

AU 2018202660B2 describes beverages comprising rare sugars and sweetness enhancers, wherein the sweetness enhancers are present at or below the sweetness recognition threshold concentration. Also provided are methods for improving the sweetness of a beverage comprising rare sugars by adding a sweetness enhancer in a concentration at or below its sweetness recognition threshold. Beverages comprising natural high potency sweeteners and rare sugars with sugar-like characteristics are also provided, wherein the natural high potency sweetener and rare sugars are present in particular weight ratios.

CA 2493066 describes a method for producing a coconut water beverage having a pH below 4.5 by adding a food grade acid to coconut water. The method coverts coconut water from a low-acid food to a high-acid food which allows the coconut water to be subjected to less severe commercial sterilization processing and preserves the natural taste and aroma of the coconut water. CA '066 is also directed to a blended beverage comprising coconut water and fruit juices that have natural isotonic properties.

AU 2009297493 describes a carbonated drink having a high gas pressure and showing an increased drinkability which has improved bubble qualities, is packed in a container provided with a resealable cap and can sustain a stimulating feeling, light taste and refreshing coolness characteristic to carbonated drinks having high gas pressure even in the case where it is stored after opening the container and then resealing. The packed carbonated drink of AU '493 contains at least one kind of condensed phosphate at a concentration of 50 ppm to 2000 ppm inclusive and a gas pressure of 2.0 to 5.0 kg/cm.

CN 102551141 describes a coconut water beverage and a preparation method and application thereof. The coconut water beverage comprises coconut water puree, coconut polypeptide powder, natural coconut water, and auxiliary materials such as a thickening agent, a sweetener, an acidulant, table salt, water and the like. The weight ratio of the coconut water puree to the coconut polypeptide powder to the natural coconut water is 1:(0.1-0.25):(0.1-0.5). In the coconut water beverage of CN '141, the coconut water puree and the coconut polypeptide powder are taken as main raw materials, and a certain amount of natural coconut water is added at the same time to compound the taste; and the coconut water beverage maintains the pure taste of the natural coconut water, is crystal, perfectly clear, cool and thirst-quenching, has unique flavor, is rich in nutrient components, has the effects of cooling, releasing toxins, tonifying spleen, promoting appetite, resisting fatigue and the like, and can meet the demands of people for the dual benefits of nutrition and health care. The preparation method for the coconut water beverage is easy to operate and is suitable for industrialized production.

EP 2510801 describes a reduced calorie beverage including rebaudioside A, erythritol and D-tagatose as a sweetener; and includes tea beverages, coffee beverages, juices, reduced calorie beverages, diet beverages, and near waters, and corresponding concentrates, as well as a carbonated soda beverage including rebaudioside A and D.

EP 2814332 describes nanoparticles for encapsulating compounds, the preparation and uses thereof. The nanoparticles are based on a hydrophobic vegetable protein, particularly zein, and a water miscible non-volatile organic solvent, particularly propylene glycol, and can encapsulate or incorporate a product of interest for use in the agricultural, cosmetic, food or pharmaceutical fields.

ES 2456704 describes beverage compositions including a steviol glycoside and a berry component.

ES 2609654 describes a nutritional composition for promoting musculoskeletal health in patients with inflammatory bowel disease. The nutritional composition includes casein protein, vitamin K in a ratio of vitamin K1:vitamin K2 of 3:1 to 1:3, vitamin K in an amount of 3.5-20 µg/100 kcal of the nutritional composition, vitamin D and alpha-linolenic acid. A pharmaceutical formulation, a nutritional formulation, a tube-feed formulation, a dietary supplement, a functional food, a beverage product or a combination thereof including the nutritional composition is also described. A method for improving musculoskeletal health is also described.

CA 2850550 describes nutritional beverage compositions including high concentrations of protein, and methods making nutrition beverage compositions including high concentrations of protein.

KR 102314002 describes a low-calorie water beverage capable of providing excellent functional characteristics and functionality, and including a sweetener containing allulose, an acidity adjuster, and water, and has 90 wt % or more of moisture content with respect to 100 wt % of the total water beverage.

U.S. Pat. No. 10,849,339 describes beverages including rare sugars and sweetness enhancers, wherein the sweetness enhancers are present at or below the sweetness recognition threshold concentration. Also provided are methods for improving the sweetness of a beverage including rare sugars by adding a sweetness enhancer in a concentration at or below its sweetness recognition threshold. Beverages comprising natural high potency sweeteners and rare sugars with sugar-like characteristics are also provided, wherein the natural high potency sweetener and rare sugars are present in particular weight ratios.

US Publication No. 20050202146 describes a water-based beverage containing soluble fibers. The water composition is substantially demineralized and has a neutral or acidic pH. The soluble fibers contained in the water composition are selected from oligosaccharides with a chain length of about 2 to 20 units and digestion-resistant malto-oligosaccharides with a molecular weight of about 2000. The water composition of the '146 Publication may be stored without any adverse effect such as hydrolysis of oligosaccharides, precipitation of the soluble fibers contained therein, and the like.

However, none of these references describe an enriched water product that includes a high concentration of dissolved hydrogen in combination with minerals and additives that provide additional health benefits. Thus, there is an urgent need for a water-based beverage that provides the benefits of dissolved hydrogen in combination with desirable minerals and additives, and is able to maintain the concentration of these components over time.

SUMMARY OF THE INVENTION

In light of the foregoing, it has been discovered that the above-noted deficiencies in conventional aqueous beverages can be addressed, and certain advantages attained, by the present invention. An objective of this invention is to provide an aqueous beverage with molecular gaseous hydrogen dissolved therein, and including a balance of minerals and additives that fulfills a market need for products that improve the health and well-being of consumers, with the hydrogen dissolved in the beverage having long term stability. The minerals can be included in the form of organic salts that have high bioavailability (compared with inorganic salts that are naturally found in waterfalls or spring water). As used herein, an organic salt is one that contains C—H bonds, and these salts occur naturally in some organs. Therefore, the bioavailability is higher than that of an inorganic or more conventional salt. Any suitable organic salt can be used in the beverage described herein, including but not limited to a lactate.

An inventive aspect of the present disclosure is a three-dimensional helical cage structure of polygonal water molecules, wherein the polygonal water molecules comprise two or more adjacent water molecules connected by hydrogen bridges, the helical cage structure has a central hollow lumen, and when viewed from a top, the helical cage structure has a hexagonal shape.

In an exemplary embodiment, the three-dimensional helical cage structure further comprises molecular hydrogen located inside the central hollow lumen of the helical cage structure.

In an exemplary embodiment, the three-dimensional helical cage structure further comprises one or more selected from the group consisting of calcium, magnesium, iron, zinc, copper and selenium located inside the central hollow lumen of the helical cage structure.

In an exemplary embodiment, the three-dimensional helical cage structure further comprises one or more selected from the group consisting of folic acid, citric acid, theanine, alanine, thiamine, vitamin 1, vitamin B2, vitamin B6, vitamin B7, vitamin B9, valine, isoleucine, citrulline, glutamine, and hydroxymethylbutyrate located inside the central hollow lumen of the helical cage structure.

Another inventive aspect of the present disclosure is a method of forming the three-dimensional helical cage structure, the method comprising: exposing standard water to a cavitation and implosion process resulting in a localized pressure of about 0.2 GPa to about 3 GPa, and a localized temperature of at least 5000 K to produce structured water comprising the three-dimensional helical cage structure of polygonal water molecules and including a central hollow lumen, wherein the polygonal water molecules comprise two or more adjacent water molecules connected by hydrogen bridges, and when viewed from a top, the helical cage structure has a hexagonal shape, wherein a density of the structured water is about 1.5 to about 5 times a density of standard water.

In an exemplary embodiment, a source of the standard water is one or more selected from atmospheric moisture, river water, sea water, ocean water, lake water, ground water, runoff water, recycled water, municipal water, tap water, glacier water, potable water, reservoir water, and waste water.

In an exemplary embodiment, the method further comprises a step of purifying the standard water prior to exposing the standard water to the cavitation and implosion process.

In an exemplary embodiment, the source of the standard water is atmospheric moisture.

In another exemplary embodiment, the method comprises condensing atmospheric moisture to form the standard water and collecting the standard water prior to exposing the standard water to the cavitation and implosion process.

Another inventive aspect of the present disclosure is an aqueous formulation comprising: the three-dimensional helical cage structure of polygonal water molecules prepared using the method described above, wherein the polygonal water molecules comprise two or more adjacent water molecules connected by hydrogen bridges, the helical cage structure has a central hollow lumen and when viewed from a top, the helical cage structure has a hexagonal shape, molecular hydrogen located within the central hollow lumen of the helical cage structure, and at least one additive located within the central hollow lumen of the helical cage structure.

In an exemplary embodiment, the at least one additive is selected from the group consisting of calcium, magnesium, iron, zinc, copper, selenium, folic acid, citric acid, thiamine, theanine, vitamin B1, vitamin B2, vitamin B6, vitamin B7, vitamin B9, alanine, valine, isoleucine, citrulline, glutamine, hydroxymethylbutyrate, and salts and derivatives thereof.

Another inventive aspect of the present disclosure is a method of preparing an aqueous formulation, the method comprising: exposing standard water to a cavitation and implosion process resulting in a localized pressure of about 0.2 GPa to about 3 GPa, and a localized temperature of at least 5000 K to produce structured water comprising a three-dimensional helical cage structure of polygonal water molecules having a central hollow lumen, wherein when viewed from a top, the helical cage structure has a hexagonal shape; and adding one or more of a first additive, a second additive and a third additive to the structured water, wherein the polygonal water molecules comprise two or more adjacent water molecules connected by hydrogen bridges, wherein a density of the structured water is about 1.5 to about 5 times a density of standard water, wherein the first additive is molecular hydrogen, wherein the second additive is one or more selected from the group consisting of calcium, magnesium, iron, zinc, copper and selenium, wherein the third additive is one or more selected from the group consisting of folic acid, citric acid, thiamine, theanine, vitamin B1, vitamin B2, vitamin B6, vitamin B7, vitamin B9, alanine, valine, isoleucine, citrulline, glutamine, and hydroxymethylbutyrate, and wherein the first, second and third additives are located inside the hollow lumen of the helical cage structure.

Another inventive aspect of the present disclosure is an aqueous formulation, comprising: a three-dimensional helical cage structure of polygonal water molecules, wherein the polygonal water molecules comprise two or more adjacent water molecules connected by hydrogen bridges, the helical cage structure has a central hollow lumen, and when viewed from a top, the helical cage structure has a hexagonal shape; molecular hydrogen located within the central hollow lumen; and an additive located within the central hollow lumen.

In an exemplary embodiment, the additive is selected from the group consisting of calcium, magnesium, iron, zinc, copper, selenium, folic acid, citric acid, thiamine, theanine, vitamin B1, vitamin B2, vitamin B6, vitamin B7, vitamin B9, alanine, valine, isoleucine, citrulline, glutamine, hydroxymethylbutyrate, and salts and derivatives thereof.

In an exemplary embodiment, the additive comprises at least one of calcium lactate, magnesium lactate, iron (II) lactate, zinc sulfate, copper sulfate, sodium selenite, citric acid, hydroxymethylbutyric acid, citrulline, glutamine, alanine, theanine vitamin B1, vitamin B2, vitamin B6, vitamin B7, vitamin B9, and vitamin B12.

In an exemplary embodiment, the additive comprises molecular hydrogen, calcium lactate, magnesium lactate, iron lactate, zinc sulfate, copper sulfate, sodium selenite, citric acid, hydroxymethylbutyric acid, citrulline, glutamine, vitamin B1, vitamin B2, vitamin B6, vitamin B7 and vitamin B9.

In an exemplary embodiment, a concentration of the molecular hydrogen about 0.1 mg/L to about 10 mg/L; a concentration of calcium lactate is about 100 mg/L to about 8200 mg/L; a concentration of magnesium lactate is about 40 mg/L to about 5800 mg/L; a concentration of iron lactate is about 1 mg/L to about 40 mg/L; a concentration of zinc sulfate is about 1 mg/L to about 20 mg/L; a concentration of copper sulfate is about 0.1 mg/L to about 2 mg/L; a concentration of sodium selenite is about 0.01 mg/L to about 0.1 mg/L; a concentration of citric acid is about 1 mg/L to about 50 mg/L; a concentration of hydroxymethylbutyric acid is about 500 mg/L to about 5000 mg/L; a concentration of citrulline is about 500 mg/L to about 5000 mg/L; a concentration of glutamine is about 500 mg/L to about 5000 mg/L; a concentration of vitamin B1 is about 0.1 mg/L to about 5 mg/L; a concentration of vitamin B2 is about 1 mg/L to about 100 mg/L; a concentration of vitamin B6 is about 10 mg/L to about 200 mg/L; a concentration of vitamin B7 is about 0.01 mg/L to about 10 mg/L; and a concentration of vitamin B9 is about 0.01 mg/L to about 10 mg/L.

In an exemplary embodiment, the additive comprises molecular hydrogen, magnesium lactate, iron lactate, zinc sulfate, copper sulfate, sodium selenite, alanine, theanine, and vitamin B12.

In an exemplary embodiment, a concentration of the molecular hydrogen is from about 0.1 mg/L to about 10 mg/L; a concentration of magnesium lactate is about 40 mg/L to about 5800 mg/L; a concentration of iron lactate is about 1 mg/L to about 40 mg/L; a concentration of zinc sulfate is about 1 mg/L to about 20 mg/L; a concentration of copper sulfate is about 0.1 mg/L to about 2 mg/L; a concentration of sodium selenite is about 0.01 mg/L to about 0.1 mg/L; a concentration of alanine is about 500 mg/L to about 10,000 mg/L; a concentration of theanine is about 10 mg/L to about 500 mg/L; and a concentration of vitamin B12 is about 0.001 mg/L to about 1 mg/L.

BRIEF DESCRIPTION OF DRAWINGS

These and other features of this invention will now be described with reference to the drawings of certain embodiments which are intended to illustrate and not to limit the invention.

DETAILED DESCRIPTION OF THE INVENTION

Figure 1:
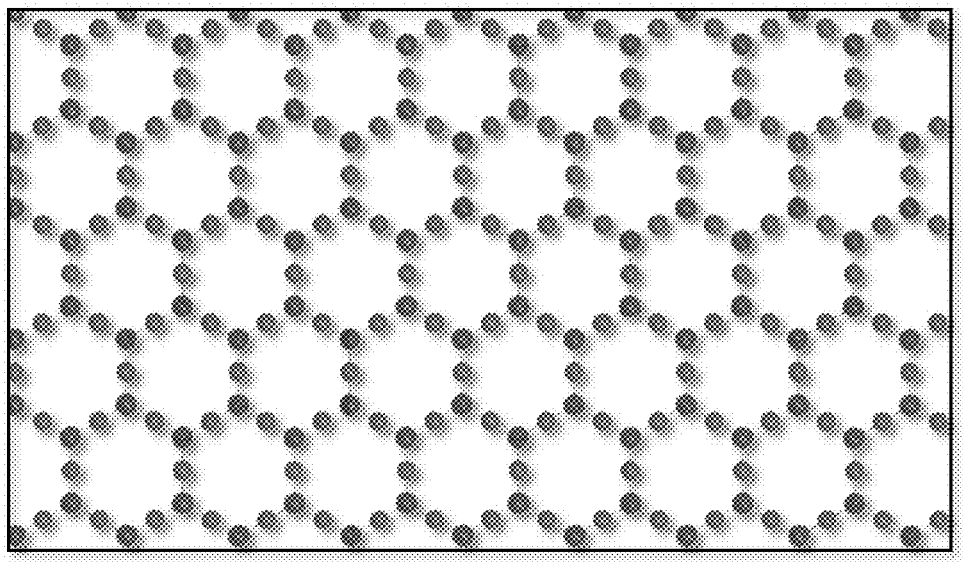
FIG. 1 is a schematic illustration of the structured water of this invention, showing a two-dimensional ordered hexagonal matrix arrangement of the water molecules after the structuration process.

Further aspects, features and advantages of this invention will become apparent from the detailed description which follows. It should be understood that the various individual aspects and features of the present invention described herein can be combined with any one or more individual aspect or feature, in any number, to form embodiments of the present invention that are specifically contemplated and encompassed by the present invention. Furthermore, any of the features recited in the claims can be combined with any of the other features recited in the claims, in any number or in any combination thereof. Such combinations are also expressly contemplated as being encompassed by the present invention.

As used herein, the singular forms "a", "an" and "the" are intended to include the plural forms as well, unless the context clearly indicates otherwise.

As used herein, the term "structured water" refers to a three-dimensional helical cage structure of polygonal water molecules having a hollow lumen, wherein the polygonal water molecules comprise two or more adjacent water molecules connected by hydrogen bridges. When viewed from the top, the arrangements of the water molecules of the helical cage structure has a hexagonal shape. The terms "structured water" and "$H_3O_2$ molecule" are used interchangeably through this application. As described earlier, the structure and growth of planar structures of water at different interfaces have been studied earlier. These previous studies are related to natural hydrogen bridge interactions in a particular zone of water, while the structured water of this invention is such that the arrangement of water molecules is altered by applying high energy processes to the water during the processes of cavitation and implosion in addition to the effects of magnetization and mineral injection processes, as described in the co-pending application. These processes change the energy of the bonds between adjacent water molecules, and a three-dimensional helical cage structure of polygonal water molecules having a hollow lumen, wherein the polygonal water molecules comprise two or more adjacent water molecules connected by hydrogen bridges with unique properties is achieved. The main differences between the "structured water" or $H_3O_2$ molecule found in the literature and that of this invention lies in the promotion of molecular self-replication, where the formation of the three-dimensional spiral cage structure of this invention, which is achieved under appropriate high energy processes, is promoted.

Moreover, the structured water of this invention is different from generally-known or described "structured water," because the "structured water" known until the discovery of this invention refers to an intrinsic process of water. In comparison, the structured water of this invention is created by the application of high energy processes ("structuration") as described herein and in the co-pending application. Structuration is a process in which, by means of implosion and cavitation energy, together with some organic and inorganic salts, at a temperature below atmospheric temperature, water is subjected to drastic changes of pressure and temperature in microstates so that this energy is able to enhance molecular interactions and change the properties of the water. As a result, the electrical and thermal conductivity of water can be changed to promote the formation of structured water of this invention. This change in the properties of water, together with the subsequent lowering of temperature, addition of molecular gases, and magnetization, promote the formation of the structured water of this invention. The structured water of this invention changes the properties of the water and the bioavailability of its constituent elements. As used herein below, unless otherwise indicated, the term structured water refers to the structured water of this invention having the inventive aspects of the present disclosure.

As used herein, a "beverage," "beverage composition", "beverage formulation," "composition" and "formulation" are used interchangeably, and refer to an aqueous formulation suitable for consumption by a subject.

Unless indicated otherwise, each of the individual features or embodiments of the present specification are combinable with any other individual feature or embodiment that are described herein, without limitation. Such combinations are specifically contemplated as being within the scope of the present invention, regardless of whether they are explicitly described as a combination herein.

Technical and scientific terms used herein have the meaning commonly understood by one of skill in the art to which the present description pertains, unless otherwise defined. Reference is made herein to various methodologies and materials known to those of skill in the art.

An inventive aspect of the present disclosure is a three-dimensional helical cage structure of polygonal water molecules, wherein the polygonal water molecules comprise two or more adjacent water molecules connected by hydrogen bridges, the helical cage structure has a central hollow lumen, and when viewed from a top, the helical cage structure has a hexagonal shape.

In an exemplary embodiment, the three-dimensional helical cage structure further comprises molecular hydrogen located inside the central hollow lumen of the helical cage structure.

In an exemplary embodiment, the three-dimensional helical cage structure further comprises one or more selected from the group consisting of calcium, magnesium, iron, zinc, copper and selenium located inside the central hollow lumen of the helical cage structure.

In an exemplary embodiment, the three-dimensional helical cage structure further comprises one or more selected from the group consisting of folic acid, citric acid, theanine, alanine, thiamine, vitamin 1, vitamin B2, vitamin B6, vitamin B7, vitamin B9, valine, isoleucine, citrulline, glutamine, and hydroxymethylbutyrate located inside the central hollow lumen of the helical cage structure.

Another inventive aspect of the present disclosure is a method of forming the three-dimensional helical cage structure, the method comprising: exposing standard water to a cavitation and implosion process resulting in a localized pressure of about 0.2 GPa to about 3 GPa, and a localized temperature of at least 5000 K to produce structured water comprising the three-dimensional helical cage structure of polygonal water molecules and including a central hollow lumen, wherein the polygonal water molecules comprise two or more adjacent water molecules connected by hydrogen bridges, and when viewed from a top, the helical cage structure has a hexagonal shape, wherein a density of the structured water is about 1.5 to about 5 times a density of standard water.

In an exemplary embodiment, a source of the standard water is one or more selected from atmospheric moisture, river water, sea water, ocean water, lake water, ground water, runoff water, recycled water, municipal water, tap water, glacier water, potable water, reservoir water, and waste water.

In an exemplary embodiment, the method further comprises a step of purifying the standard water prior to exposing the standard water to the cavitation and implosion process.

In an exemplary embodiment, the source of the standard water is atmospheric moisture.

In another exemplary embodiment, the method comprises condensing atmospheric moisture to form the standard water and collecting the standard water prior to exposing the standard water to the cavitation and implosion process.

Another inventive aspect of the present disclosure is an aqueous formulation comprising: the three-dimensional helical cage structure of polygonal water molecules prepared using the method described above, wherein the polygonal water molecules comprise two or more adjacent water molecules connected by hydrogen bridges, the helical cage structure has a central hollow lumen and when viewed from a top, the helical cage structure has a hexagonal shape, molecular hydrogen located within the central hollow lumen of the helical cage structure, and at least one additive located within the central hollow lumen of the helical cage structure.

In an exemplary embodiment, the at least one additive is selected from the group consisting of calcium, magnesium, iron, zinc, copper, selenium, folic acid, citric acid, thiamine, theanine, vitamin B1, vitamin B2, vitamin B6, vitamin B7, vitamin B9, alanine, valine, isoleucine, citrulline, glutamine, hydroxymethylbutyrate, and salts and derivatives thereof.

Another inventive aspect of the present disclosure is a method of preparing an aqueous formulation, the method comprising: exposing standard water to a cavitation and implosion process resulting in a localized pressure of about 0.2 GPa to about 3 GPa, and a localized temperature of at least 5000 K to produce structured water comprising a three-dimensional helical cage structure of polygonal water molecules having a central hollow lumen, wherein when viewed from a top, the helical cage structure has a hexagonal shape; and adding one or more of a first additive, a second additive and a third additive to the structured water, wherein the polygonal water molecules comprise two or more adjacent water molecules connected by hydrogen bridges, wherein a density of the structured water is about 1.5 to about 5 times a density of standard water, wherein the first additive is molecular hydrogen, wherein the second additive is one or more selected from the group consisting of calcium, magnesium, iron, zinc, copper and selenium, wherein the third additive is one or more selected from the group consisting of folic acid, citric acid, thiamine, theanine, vitamin B1, vitamin B2, vitamin B6, vitamin B7, vitamin B9, alanine, valine, isoleucine, citrulline, glutamine, and hydroxymethylbutyrate, and wherein the first, second and third additives are located inside the hollow lumen of the helical cage structure.

Another inventive aspect of the present disclosure is an aqueous formulation, comprising: a three-dimensional helical cage structure of polygonal water molecules, wherein the polygonal water molecules comprise two or more adjacent water molecules connected by hydrogen bridges, the helical cage structure has a central hollow lumen, and when viewed from a top, the helical cage structure has a hexagonal shape; molecular hydrogen located within the central hollow lumen; and an additive located within the central hollow lumen.

In an exemplary embodiment, the additive is selected from the group consisting of calcium, magnesium, iron, zinc, copper, selenium, folic acid, citric acid, thiamine, theanine, vitamin B1, vitamin B2, vitamin B6, vitamin B7, vitamin B9, alanine, valine, isoleucine, citrulline, glutamine, hydroxymethylbutyrate, and salts and derivatives thereof.

In an exemplary embodiment, the additive comprises at least one of calcium lactate, magnesium lactate, iron (II) lactate, zinc sulfate, copper sulfate, sodium selenite, citric acid, hydroxymethylbutyric acid, citrulline, glutamine, alanine, theanine vitamin B1, vitamin B2, vitamin B6, vitamin B7, vitamin B9, and vitamin B12.

In an exemplary embodiment, the additive comprises molecular hydrogen, calcium lactate, magnesium lactate, iron lactate, zinc sulfate, copper sulfate, sodium selenite, citric acid, hydroxymethylbutyric acid, citrulline, glutamine, vitamin B1, vitamin B2, vitamin B6, vitamin B7 and vitamin B9.

In an exemplary embodiment, a concentration of the molecular hydrogen about 0.1 mg/L to about 10 mg/L; a concentration of calcium lactate is about 100 mg/L to about 8200 mg/L; a concentration of magnesium lactate is about 40 mg/L to about 5800 mg/L; a concentration of iron lactate is about 1 mg/L to about 40 mg/L; a concentration of zinc sulfate is about 1 mg/L to about 20 mg/L; a concentration of copper sulfate is about 0.1 mg/L to about 2 mg/L; a concentration of sodium selenite is about 0.01 mg/L to about 0.1 mg/L; a concentration of citric acid is about 1 mg/L to about 50 mg/L; a concentration of hydroxymethylbutyric acid is about 500 mg/L to about 5000 mg/L; a concentration of citrulline is about 500 mg/L to about 5000 mg/L; a concentration of glutamine is about 500 mg/L to about 5000 mg/L; a concentration of vitamin B1 is about 0.1 mg/L to about 5 mg/L; a concentration of vitamin B2 is about 1 mg/L to about 100 mg/L; a concentration of vitamin B6 is about 10 mg/L to about 200 mg/L; a concentration of vitamin B7 is about 0.01 mg/L to about 10 mg/L; and a concentration of vitamin B9 is about 0.01 mg/L to about 10 mg/L.

In an exemplary embodiment, the additive comprises molecular hydrogen, magnesium lactate, iron lactate, zinc sulfate, copper sulfate, sodium selenite, alanine, theanine, and vitamin B12.

In an exemplary embodiment, a concentration of the molecular hydrogen is from about 0.1 mg/L to about 10 mg/L; a concentration of magnesium lactate is about 40 mg/L to about 5800 mg/L; a concentration of iron lactate is about 1 mg/L to about 40 mg/L; a concentration of zinc sulfate is about 1 mg/L to about 20 mg/L; a concentration of copper sulfate is about 0.1 mg/L to about 2 mg/L; a concentration of sodium selenite is about 0.01 mg/L to about 0.1 mg/L; a concentration of alanine is about 500 mg/L to about 10,000 mg/L; a concentration of theanine is about 10 mg/L to about 500 mg/L; and a concentration of vitamin B12 is about 0.001 mg/L to about 1 mg/L.

The above-described concentrations of the various components can be equal to any integer value or values within any of the above-described numerical ranges, including the end-points of these ranges and any acceptable variances.

An inventive aspect of this application is an aqueous beverage that includes minerals in the form of organic salts that have high bioavailability (i.e., higher bioavailability in comparison with the inorganic salts that are naturally found in waterfalls or spring water), along with inorganic minerals and molecular hydrogen dissolved therein. The inventive aqueous beverage has a high concentration of molecular hydrogen dissolved therein, as compared to conventional beverages and/or formulations available in the market. The dissolved molecular hydrogen is retained in the aqueous formulation over time because the creation of exclusion zones within the structured water of this invention allows for hydrogen retention for longer periods of time. For example, the dissolved hydrogen may be retained in the aqueous beverage in the form of hydrogen nanobubbles for a period of about 1 day to about 6 months, but is not limited thereto.

Another inventive aspect of the present invention is the inclusion of trace elements, including but not limited to minerals and/or additives that improve hydrogen retention and increases the health benefits of the aqueous formulation. Trace elements or temporary bio-elements, are elements present in small amounts in the body, whose absence or excess can impair the chemical balance of the body. For this reason, it is essential that these elements are present in appropriately balanced amounts for the proper functioning of the chemical processes that occur at the cellular level and thus achieve optimal performance of physiological systems.

Trace elements have at least five functions in living organisms. Some are an integral part of the catalytic centers in which the reactions necessary for life happen. Trace elements are involved in attracting substrate molecules and converting them into specific end products. Certain trace elements yield or accept electrons during oxidation or reduction reactions. Several trace elements have structural functions, provide stability to certain important biological molecules, and others exert regulatory functions. They also control important biological processes through certain actions, including hormonal activation, binding molecules to their receptor sites on cell membranes, and inducing the expression of some genes. See, e.g., Berdanier, C. D. (2010). "Ocho: Deficiencia de oligoelementos. En Nutrición y alimentos", (pag. 147). Mexico: Mc Graw Hill. Some examples of such trace elements are:

Calcium: Calcium is associated with the structure of bones and teeth in the form of hydroxyapatite crystals. However, besides this well-known function, calcium has other functions that, which, although not well known, are fundamental to the metabolism of the human body. For example, each cell membrane has channels that depend on calcium and these channels are one of the body's most used forms for cellular communication. This communication is visible in the contraction of cardiac muscles and influences cardiac rhythm wherein its alterations could lead to cardiac arrhythmias and lead to alterations in the contraction of blood vessels (which are a vital factor for the control of blood pressure). Just as calcium affects the contraction of cardiac muscle, it also affects the contraction of each muscle. Thus, bodily movements also depend on calcium. Calcium also influences the degradation of glycogen by insulin to supply energy. In addition to the aforementioned functions, there are seven calcium-dependent factors and regulators in the complex vitamin K-dependent pathway, which effects the coagulation of blood and associated repair processes.

Magnesium: Commonly, magnesium is associated with green leafy vegetables and with muscular problems associated with the appearance of "cramps", but we know little about its direct action. This element participates in more than three hundred different metabolic processes. Measuring the levels of magnesium in blood (i.e., concentration of magnesium in plasma) is usually not related to the true levels of magnesium in our body, because magnesium is easily dissipated in each cellular structure to perform its functions. Magnesium is required by the protein that synthesizes adenosine triphosphate (ATP) in mitochondria. ATP is the molecule that provides energy to almost all metabolic processes in our body. Thus, without magnesium there would be no energy to function. Magnesium also plays an important role along with calcium in bone formation, as well as in the structure of cell membranes and chromosomes, which are structures that have specific folding geometries and include genetic information. Magnesium is also included in cell signaling molecules corresponding to cyclic adenosine monophosphate (cAMP), which is important for the activation of proteins mainly for hormonal functioning, including the activation of the parathyroid hormone that is important for the regulation of calcium and magnesium and also participates in cell migration processes that are necessary for wound healing.

Iron: Iron is well known as a constituent of hemoglobin, and for performing basic functions associated with the transport of oxygen in our blood. Additionally, iron is also involved in multiple processes including repairing DNA and immunological functions. Iron participates in a pathway associated with NADH dehydrogenase, which, along with ATP, participates in the production of energy at the cellular level. Iron also participates in detoxification processes mainly through the group of enzymes called cytochromes associated with the metabolism of drugs and pollutants that are eliminated from our system in a cleansing phenomenon. One of the mechanisms of cell destruction and damage is through oxygen radicals wherein catalases and some peroxidases that are iron-dependent act as antioxidants that prevent the negative effect of these oxygen radicals. The iron-dependent ribonucleotide reductases (RNR) are important because they help to repair DNA (genetic information). Additionally, iron directly acts in the formation of T-lymphocytes, which are the defending cells that regulate immune response during inflammatory and infectious processes. In conditions of low oxygenation, such as inhabitants in settlements located high above mean sea level, or in patients with lung diseases that do not allow for adequate oxygenation (e.g., patients with chronic obstructive pulmonary disease (COPD)), iron participates in processes that accelerate formation of red blood cells (erythropoiesis) and in the formation of new blood vessels (angiogenesis) to obtain better levels of oxygen in these specific conditions.

Copper: Although it is not a well-known element as a key promoter of metabolic pathways, copper participates in various metabolic situations through complex enzymes called cuproenzymes or copper-dependent enzymes that participate in the production of cellular energy by means of oxidized cytochrome c that allows the production of cellular ATP. One of these enzymes is lysyl oxidase that is essential for the integrity of the main connective tissue of the heart and blood vessels as well as for the formation of bones. Another enzyme is ferroxidase that participates in the metabolism and formation of iron, and therefore, copper also assists in transporting and storing of oxygen. Cuproenzymes also participate in the proper functioning of the human brain by forming neurotransmitters that control all brain functions and, specifically, participate in the formation of dopamine and then in the formation of norepinephrine. Similarly, these copper-dependent enzymes are necessary for the maintenance of myelin, which is a protective coating of neurons and are responsible for high-speed transmission of information through the neural network. Superoxide dismutase and catalases are also copper-dependent enzymes, which participate in the elimination of oxygen free radicals that deteriorate our cell membranes and can counteract cell damage by participating as antioxidants.

Selenium: Selenium is a component of complex families called selenoproteins that are generated by the encoding of more than twenty-five genes wherein, although most of the specific functions of said families are known, some metabolic functions are still unknown. However, one of their main functions, which is common to most families, is the reduction of oxidative stress (i.e., deterioration of cell membranes by free radicals) wherein selenium-dependent proteins are one of the main natural antioxidant systems of the human body. Each family of these proteins has specific actions directed to specific organs, for example, thioreductase participates in the proper functioning of the thyroid; selenoprotein P acts mainly on brain and testicles; selenoprotein W not only protects the skeletal muscle and heart, but also the breast and the prostate; and selenoprotein S participates in reparation process of DNA. With each one of these families, the human body has an antioxidant structure for a number of organs with protective functions that sometimes covers several systems.

Zinc: Zinc plays an important role in the growth and development of human body, immune function, neurotransmission, vision, reproduction, and intestinal ion transport. Zinc is involved in more than three thousand metabolic processes within the human body. For a better understanding, the functions of zinc can be divided into catalytic functions and structural functions. The different functions of the human body are carried out by the action of proteins wherein, at cellular level, the formation of said proteins needs a specific molecular structure. Without said specific molecular structure, i.e., protein folding, the protein is not functional and its action is not possible. Zinc is essential for the function of proteins because it ensures folding of the original structure into said specific molecular structure, wherein this element, not only participates in the formation of proteins (catalytic action), but also in the maintenance of the protein (structural action). Zinc is also involved in other processes such as a special detoxification process corresponding to the elimination of heavy metals by the action of metallothioneins; cellular energy production; and the process of nerve impulse transmission.

Another aspect of the invention is the inclusion of additives, for example, valine, isoleucine, citrulline, glutamine, and the like, that improves the properties of water, whereby consuming water that includes these additives can affect the performance of physical activities such sports. For example:

Valine is an essential branched-chain amino acid, and is one of the twenty amino acids used by cells to synthesize proteins. Valine is involved in the formation, repair and metabolism of muscle tissue and helps to regulate positive nitrogen levels. It is used to help produce energy by the muscles during physical activity. It also protects the nervous system and therefore it helps to maintain mental health and balanced of blood sugar levels.

Isoleucine is an essential amino acid that helps in the production of proteins. Other functions include, for example, regulation of blood sugar levels, hemoglobin formation and muscle tissue reparation.

Citrulline is a non-essential amino acid that is formed inside mitochondria mainly from ornithine or glutamine. The pathway of citrulline starts in mitochondria and then citrulline leaves mitochondria to form arginine and finally urea. Citrulline is also a precursor of nitric oxide, and thus, helps to eliminate nitrogenous waste products from human body. Therefore, it is often used in supplements that seek to increase nitric oxide synthesis. Citrulline also has the ability to relax blood vessels, helps with the protection of the cardiovascular system and improves the immune system.

Glutamine helps to control inflammation and a body's exaggerated response to diseases thereby improving patients' health; establishes the balance between dilation and contraction of blood vessels; helps to transport lymphocytes and neutrophils to the site of aggression; helps the intestine cells to function as a barrier against infections; and promotes the function of nutrient absorption and protection.

Although certain exemplary minerals and additives are described in the preceding paragraphs, the present invention is not limited thereto, and any mineral and/or additive that provides beneficial effects to a consumer can be included in the beverage of the present invention.

The aqueous formulation can also be a functional aqueous beverage that includes dissolved molecular hydrogen, minerals and/or additives, and additional elements that provide energy, improve cardiovascular activity and replenish nutrients lost during strenuous activity, exertion and/or physical training. The additional elements can be any suitable element, compound or composition that provides the discussed properties, including but not limited to one or more branched-chain amino acids, creatinine, β-alanine, L-carnitine, β-hydroxy β-methylbutyric acid (HMB), thiamine, casein, glucosamine, collagen, hyaluronic acid, cysteine, methionine, arginine, aspartic acid, glutamic acid, glycine, histidine, phenylalanine, proline, threonine, lysine, tyrosine, Vitamin A, Vitamin C, Vitamin D, Vitamin E, Vitamin K, isoflavones, chenopodin or 11S-type globulin, 2S albumin, choline, protease, lipase, amylase, lactase, sunflower lecithin, 7-keto hydroepiandrosterone (DHEA), diindolylmethane, arbutin, ursolic acid, tannic acid, and the like.

The hydrogen, minerals and additives are retained in the aqueous formulation over time because of the formation of structured water of this invention. The process of forming the structured water of this invention ("structuration process") includes formation of implosion bubbles that generate the energy required for the formation of the structured water of this invention. The process of forming $H_3O_2$ molecules includes the generation of cavitation bubbles at appropriate temperature and pressure conditions, and a subsequent implosion process. The implosion process and the hydrodynamic impact generated from the implosion of several individual cavitation bubbles near a rigid boundary affects pressure relative to the geometric characteristics of the area, and generates $H_3O_2$.

The word cavitation is derived from cavity, and has its origins in Latin. Cavitation was first successfully studied by Reynolds in 1984 ("Effect of different design features of the reactor on hydrodynamic cavitation process", J. Ozonek, K. Lenik b, Archives of Materials Science and Engineering, Vol:52, Iss:2,2011, pag: 112-117). Cavitation describes a phenomenon that occurs inside a liquid when a pressure field is subjected to changes in time and distance. These changes depend on the properties of the liquid which causes the formation of voids, filled with the fluid in its vapor phase, which are then violently compressed, reaching gaseous phases at high pressure and temperature. Due to this process, there is a rapid transfer of energy between a zone where there was previously a vacuum and where the water changes in density.

The molecular structures present in structured water, the geometric characteristics of the individual incubation molecules, as well as the groups of molecules, were simulated, and the hydrodynamic impact pressure of the implosion of an individual cavitation bubble was calculated as described in the co-pending application, which is incorporated herein in its entirety, based on a qualitative characterization of various parameters, such as the hydrodynamic impact pressure and the impact velocity of a liquid microjet, and the hydrodynamic gravity generated by the cavitation and implosion processes. Most hydrodynamic impacts were in the range of a calculated local pressure of 0.2 GPa to 3 GPa. The calculated temperatures attained in these processes reach more than 5000 K in nanoseconds, which causes the fluid density to change about 1.5 to about 6 times in the zones closest to the implosion.

The water included in the aqueous formulation of this application can be obtained from any water source, including but not limited to non-drinkable water that is treated to make it drinkable; a rural or urban water supply network; atmospheric water that is condensed, collected, and used as water source; and the like, but are not limited thereto, and water from any water source can be used.

The aqueous formulation has a dissolved hydrogen concentration of about 0.1 mg/L to about 10 mg/L. The higher the concentration of dissolved hydrogen in water, the higher the amount of hydrogen provided to cells that lead to the numerous benefits as described above. The dissolved hydrogen concentration can be equal to any integer value or values within this range, including the end-points of these ranges and any acceptable variance.

The aqueous beverage may also comprise other gases such as oxygen, carbon dioxide, nitrogen or a combination thereof, and in any appropriate amount suitable for human consumption.

In addition to the dissolved hydrogen, the aqueous formulation can further include minerals including one or more selected from calcium (Ca), magnesium (Mg), iron (Fe), zinc (Zn), copper (Cu), and selenium (Se), but are not limited thereto, and any suitable mineral can be included in any suitable amount.

One or more of these minerals can be in the form of a water soluble salt selected from lactate, sulfate, selenite, halide, nitrate, acetate, hydroxides, and the like, but are not limited thereto, and any suitable anion safe for consumption and/or ingestion can be used. In certain other embodiments, various suitable cations can be used in conjunction with any suitable anion that is safe for consumption and/or ingestion. In certain other embodiments, the macro- and/or micronutrient is a lactate or a selenite. In certain other embodiments, the mineral is one or more selected from calcium lactate, magnesium lactate, iron lactate, zinc lactate, copper lactate, sodium selenite, zinc sulfate, copper (II) sulfate pentahydrate, and the like. Suitable minerals that can be included in the water composition described herein are not limited, and any mineral that is considered essential for the proper functioning of a human body and/or essential for life and/or considered essential trace elements and/or found in natural mineral water can be used provided the added minerals do not significantly affect the taste of the final beverage.

The concentration of calcium salt, present in certain embodiments of the aqueous beverage of this invention as calcium lactate but not limited thereto, can be about 100 mg/L to about 8200 mg/L. The dissolved calcium concentration can be equal to any integer value or values within this range, including the end-points of these ranges and any acceptable variance.

The concentration of magnesium salt, present in certain embodiments of the aqueous beverage of this invention as magnesium lactate but not limited thereto, can be about 40 mg/L to about 5800 mg/L. The dissolved magnesium concentration can be equal to any integer value or values within this range, including the end-points of these ranges and any acceptable variance.

The concentration of iron salt, present in certain embodiments of the aqueous beverage of this invention as iron lactate but not limited thereto, can be about 1 mg/L to about 40 mg/L. The dissolved iron concentration can be equal to any integer value or values within this range, including the end-points of these ranges and any acceptable variance.

The concentration of zinc salt, present in certain embodiments of the aqueous beverage of this invention as zinc lactate but not limited thereto, can be about 1 mg/L to about 20 mg/L. The dissolved zinc concentration can be equal to any integer value or values within this range, including the end-points of these ranges and any acceptable variance.

The concentration of copper salt, present in certain embodiments of the aqueous beverage of this invention as copper lactate but not limited thereto, can be about 0.01 mg/L to about 2.0 mg/L. The dissolved copper concentration can be equal to any integer value or values within this range, including the end-points of these ranges and any acceptable variance.

The concentration of selenium salt, present in certain embodiments of the aqueous beverage of this invention as sodium selenite but not limited thereto, can be about 0.001 mg/L to about 0.5 mg/L. The dissolved selenium concentration can be equal to any integer value or values within this range, including the end-points of these ranges and any acceptable variance.

The aforementioned concentrations of elements not only provide health benefits, but also increase the retention of hydrogen in the aqueous beverage of this invention.

The aqueous formulation can further include one or more amino acids selected from biotin (vitamin B7), folic acid (vitamin B9), thiamine (vitamin B1), riboflavin (vitamin B2), pyridoxine (vitamin B6), cobalamine (vitamin B12), L-alanine, L-valine, L-isoleucine, L-citrulline, L-glutamine, theanine, and the like, but are not limited thereto, and any suitable amino acid can be included in the aqueous formulation. Any suitable metabolites of essential amino acids, such as hydroxymethylbutyrate or β-hydroxy β-methylbutyrate, can also be included, but is not limited thereto. Other suitable elements, compounds or compositions that can be added to the aqueous formulations of this invention includes, but is not limited to, branched-chain amino acids, creatinine, β-alanine, L-carnitine, β-hydroxy β-methylbutyric acid (HMB), thiamine, casein, glucosamine, collagen, hyaluronic acid, cysteine, methionine, arginine, aspartic acid, glutamic acid, glycine, histidine, phenylalanine, proline, threonine, lysine, tyrosine, Vitamin A, Vitamin C, Vitamin D, Vitamin E, Vitamin K, isoflavones, chenopodin or 11S-type globulin, 2S albumin, choline, protease, lipase, amylase, lactase, sunflower lecithin, 7-keto hydroepiandrosterone (DHEA), diindolylmethane, arbutin, ursolic acid, tannic acid, and the like.

The concentration of biotin in the aqueous formulation can be about 0.1 mg/L to about 6.0 mg/L. The dissolved biotin concentration can be equal to any integer value or values within this range, including the end-points of these ranges and any acceptable variance.

The concentration of folic acid in the aqueous formulation can be about 0.1 mg/L to about 10 mg/L. The dissolved folic acid concentration can be equal to any integer value or values within this range, including the end-points of these ranges and any acceptable variance.

The concentration of thiamine in the aqueous formulation can be about 0.1 mg/L to about 10 mg/L. The dissolved thiamine concentration can be equal to any integer value or values within this range, including the end-points of these ranges and any acceptable variance.

The concentration of vitamin B2 in the aqueous formulation can be about 4.0 mg/L to about 120 mg/L. The dissolved vitamin B2 concentration can be equal to any integer value or values within this range, including the end-points of these ranges and any acceptable variance.

The concentration of vitamin B6 in the aqueous formulation can be about 10 mg/L to about 500 mg/L. The dissolved vitamin B6 concentration can be equal to any integer value or values within this range, including the end-points of these ranges and any acceptable variance.

The concentration of L-valine in the aqueous formulation can be about 400 mg/L to about 15,000 mg/L. The dissolved L-valine concentration can be equal to any integer value or values within this range, including the end-points of these ranges and any acceptable variance.

The concentration of L-isoleucine in the aqueous formulation can be about 400 mg/L to about 15,000 mg/L. The dissolved L-isoleucine concentration can be equal to any integer value or values within this range, including the end-points of these ranges and any acceptable variance.

The concentration of L-citrulline in the aqueous formulation can be about 400 mg/L to about 15,000 mg/L. The dissolved L-citrulline concentration can be equal to any integer value or values within this range, including the end-points of these ranges and any acceptable variance.

The concentration of L-glutamine in the aqueous formulation can be about 400 mg/L to about 15,000 mg/L. The dissolved L-glutamine concentration can be equal to any integer value or values within this range, including the end-points of these ranges and any acceptable variance.

Structuration of Water Molecules

The aqueous formulation including dissolved hydrogen, where the amount of dissolved hydrogen is stable over time, can be realized based on the formation of the $H_3O_2$ structured molecule of this invention. These molecular structures are formed through hydrogen bridges between adjacent water molecules, and can include a series of molecular structures that are composed of multiple water molecules in a planar orientation connected with atomic or molecular hinges, where adjacent water molecules can form hexagonal rings of water. Multiple hexagonal rings of water can be connected to form multiple layers or a three-dimensional helical cage structure as in this invention. The application of an electromagnetic force for a duration of a few nanoseconds to these structures improves the stability of the hydrogen bonds between the constituent molecules. The electromagnetic force is created and applied through the processes of cavitation and implosion where multiple such structures can combine to form larger structures.

The structured water, or $H_3O_2$, of the present invention can be created by any of the following methods, but is not limited thereto.

Figure 2:
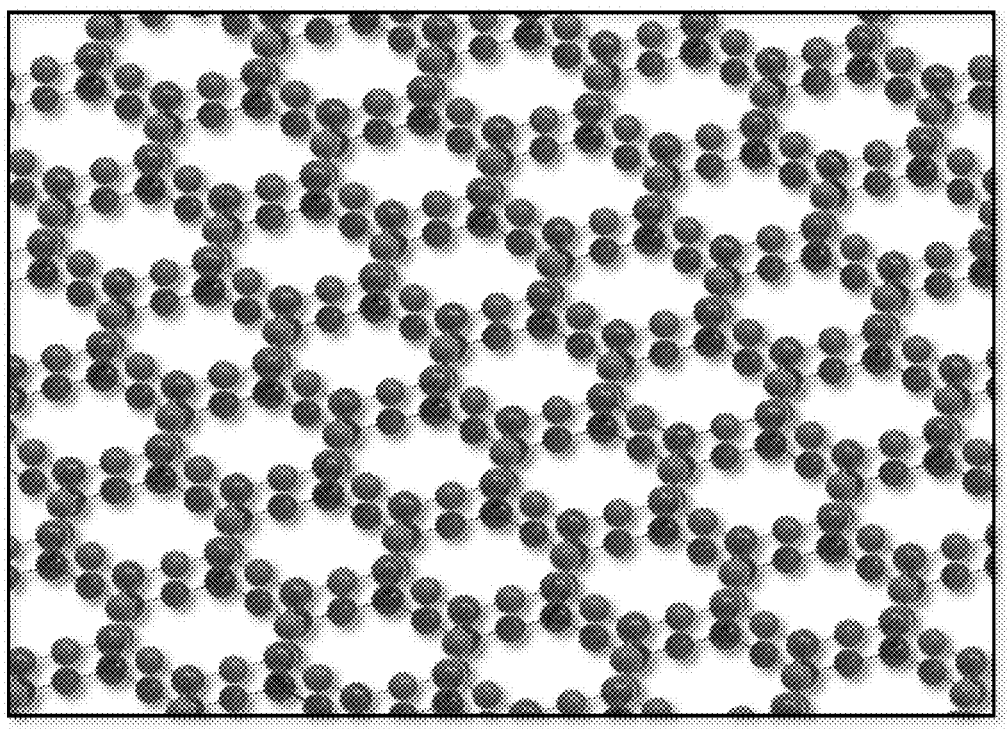
FIG. 2 is an illustration of the hexagonal arrangement of water molecules showing two contiguous planes of hexagonal formations of hydrogen and oxygen molecules where the plane of the water molecule is parallel to the surface.
Figure 3A:
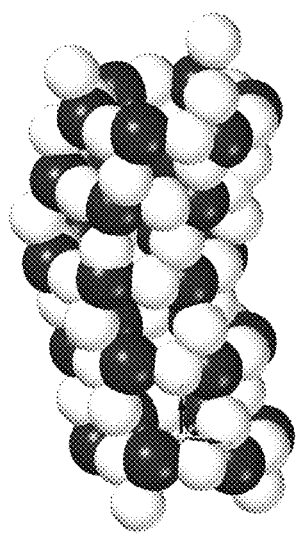
FIG. 3A is an illustration of a single three-dimensional helical cage structure of polygonal water molecules of the structured water of this invention.
Figure 3B:
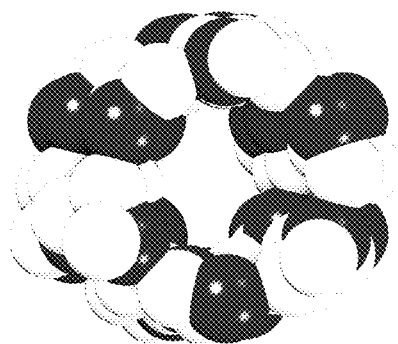
FIG. 3B is a top view of the helical structure of FIG. 3A.

For example, adjacent molecules are joined by means of hydrogen bridges to form a hexagonal structure as shown in FIGS. 1, 2, 3A and 3B. FIG. 1 is a schematic illustration of a two-dimensional ordered hexagonal matrix arrangement of water molecules where the pattern is replicated in the different planes, and this formation is considered superior over the general arrangement of water molecules, and allows the density of the fluid to decrease in addition to the change of electromechanical properties. FIG. 2 is an illustration of the hexagonal arrangement of water molecules showing two contiguous planes of hexagonal formations of hydrogen and oxygen molecules where the plane of the water molecule is parallel, or substantially parallel, to the surface. FIG. 3A is an illustration of a single three-dimensional helical cage structure of polygonal water molecules, wherein the polygonal water molecules comprise two or more adjacent water molecules connected by hydrogen bridges. FIG. 3B is a top view of the single spiral cage structure of FIG. 3A showing the hexagonal shape of the three-dimensional helical cage structure. FIG. 3B shows a single three-dimensional helical cage structure of this invention and has the measurement of the atomic radii to scale, as estimated for the given thermodynamic conditions discussed herein. Although FIG. 3B is a top view of a single helical cage structure, multiple representations of the water molecules can be seen because the helix atoms are shown at the bottom of the foreground.

Multiple hexagonal structures formed by adjacent water molecules can be stacked in a direction perpendicular to the plane that forms the hexagonal structure. Each of the hexagonal structures forming the stacked structure can be rotated due to its electromagnetic properties. The arrangement of the hexagonal structures formed by the $H_3O_2$ molecule can also be replicated in different planes, which allows an increase in the density of the fluid in addition to the change of electromechanical properties. In other arrangements, two contiguous planes of hexagonal structures can be formed.

The stability and resultant properties of the structured water formed by the interaction of adjacent water molecules is a result of the electromagnetic effects between the molecular hydrogen and the $H_3O_2$ structure of this invention. This structure forms a matrix that has the ability to weave a network capable of trapping the hydrogen molecule within the hollow lumen formed in the three-dimensional cage structure of the $H_3O_2$. This arrangement imparts buoyancy forces to the $H_3O_2$ structure and reduces or maintains, but does not increase, any forced entanglement between the adjacent water molecules. This behavior can be explained by the Zeeman/Stark effect, where, despite the small electromagnetic field exerted by the atoms on the water molecules, they affect the energy levels around them and change as described by these phenomena.

Figure 4:
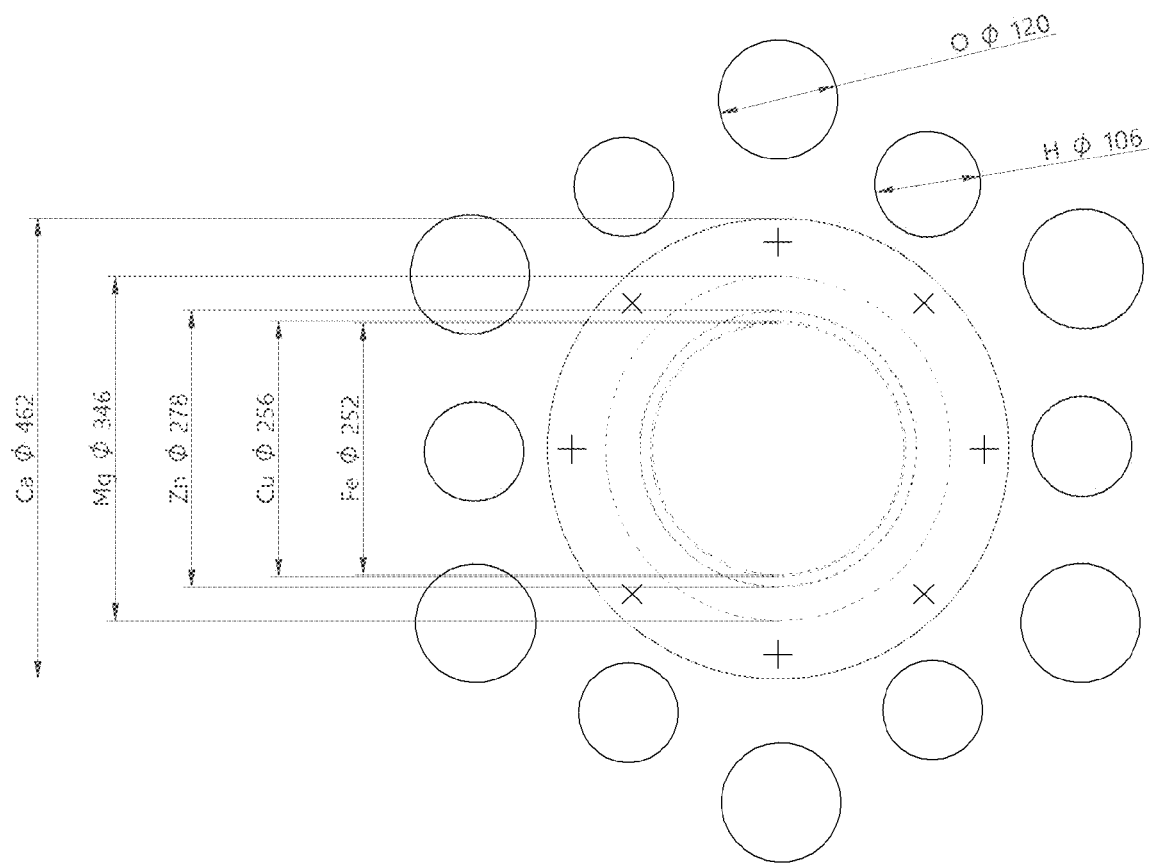
FIG. 4 is a visual representation of the arrangement of various cations within the hollow lumen of the structured water of this invention.

The hexagonal structures formed by hydrogen bridging between adjacent water molecules results in a stabilized material and different salts can adhere to the surface of the stabilized material. As illustrated in FIG. 4, the size and structure of various organic salts of the minerals is such that they can be accommodated within the three-dimensional helical cage structure of the $H_3O_2$ molecule of this invention. The structured water of this invention preferably comprises a material that includes metals (such as, but not limited to, calcium, magnesium, iron, zinc, copper and selenium) and their salts, such as described above.

The phenomenon of the formation of vapor in a fluid by a sudden decrease in pressure is known as cavitation. For this process the liquid is subjected to temperature above 5000° C. and pressures above 10 MPa. These temperature and pressure values are achieved from the potential energy of an implosion of water-vapor bubble and the kinetic energy of the fluid. The potential energy is established based on the specific pressure and volume parameters of each molecule, and is equal to the work generated by a pressure difference $P_d-P_v$ on its vapor volume throughout the collapse of the cavitation bubble, wherein $P_d$ is the impeller (rotor) pressure and $P_v$ is the vapor pressure of the cavitation bubble. The implosion energy of an undisturbed vapor bubble is equal to the ambient pressure p∞, as shown in Function 1:

$$E_{pot,0}^b = \frac{4}{3}\pi R_0^3 (p_\infty - p_v),$$

as described in "The relevance of kinematics for cavitation implosion loads Physics of Fluids", 31, S. Schenke, T. Melissaris, and T. J. C. van Terwisga, 2019 (Schenke 2019).

In Function 1, $E_{pot,0}^b$ is the potential energy of the bubble, $R_0$ is the initial radius of the bubble, (p∞, pv) are ambient pressure and vapor pressure respectively, and this function is valid for an undisturbed spherical bubble. The thermochemically stabilized structure imparts new properties to the fluid, changing its thermal and electrical conductivity, among others, that improves interactions with electronegative structures, for example cells of a mammalian body.

Further details of the creation of the structured water of this invention, including a system used to create the structured water of this invention, is described in the co-pending application, which is incorporated herein in its entirety.

Referring back to FIGS. 3A and 3B, the structural organization of the structured water of this invention is shown in these figures. As shown in FIGS. 1 and 2, adjacent water molecules of liquid water at 4° C. are arranged in a hexagonal arrangement, and multiple planes of this hexagonal arrangement of the water molecules are connected via hydrogen bridges to form the three-dimensional helical cage structure shown in FIG. 3A. In this model, the local charge depends on the density of electronegative oxygen atoms. This model explains the changes in electronegativity in the exclusion zone where this configuration occurs, and also explains the changes in the properties such as a 10% higher refractive index than normal water and a 10% higher density than normal water.

FIG. 3B is a top view of the arrangement of the water molecules shown in FIG. 3A. This three-dimensional helical cage structure is created by the cavitation and implosion processes, as described above, and also described in the co-pending application.

Homogenization is very important for the proper breaking of the different bonds for the solubilization of molecules. Referring back to FIG. 4, the organic salts of the minerals included in the aqueous beverage of this invention are electronegative in nature, and can organize themselves into a similar arrangement as the arrangement of the water molecules shown in FIGS. 3A and 3B. That is, the atomic size of these elements is such that they can be captured within the hollow lumen created in the three-dimensional helical cage structure of this invention.

Other properties of the fluid that is formed refer to the electrokinetics obtained from the addition of hydrogen in its gaseous form ($H_2$) comprising an ionic aqueous solution of nanostructures containing stabilized hydrogen. This gas together with the water molecule, when it touches the surface of a cell wall, modulates a potential of the cell membrane, as well as the electrical properties of the cell membrane. As a result, the ionic aqueous fluid electrokinetically provides regulation of cell membrane potentials and helps with intracellular signal transduction.

Referring back to FIGS. 3A and 3B, the three-dimensional spiral cage structure formed by hydrogen bridging of adjacent molecules based on the energy generated in the cavitation and implosion process creates a channel (hollow lumen), which can trap various components therein. By forming these structures, the water can retain the dissolved hydrogen molecules, minerals and additives for longer time periods. The stability of the dissolved components is also affected by the interaction of the $H_2$ bridges with the structured water molecules.

Figure 5A:
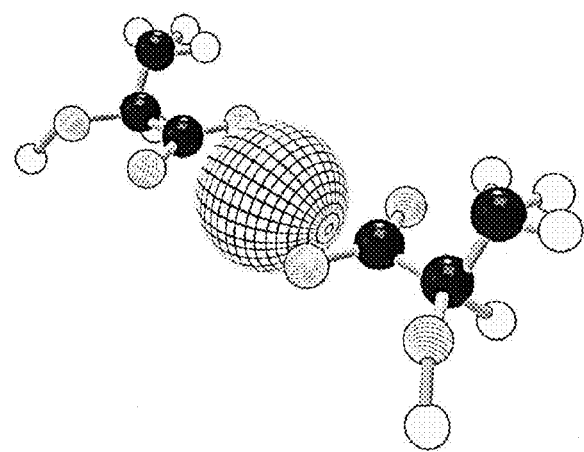
FIGS. 5A and 5B are illustrations of a calcium lactate molecule, showing the separation of the molecule into three parts due to dissolution in water.
Figure 5B:
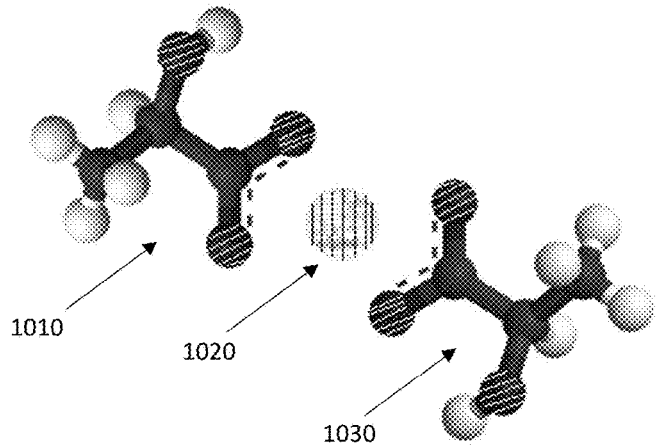

Water can dissociate salts of the minerals described herein, where the polarity of the salts together with the dissociation process allows for the formation of regular water polygons and the formation of hydrogen bridges. The dissolution of the salt molecule separates the salt molecule into three parts—two symmetrical parts and a central atom. As an example, FIGS. 5A and 5B are ball-and-stick representations of a calcium lactate molecule. FIG. 5A is a visual representation of an intact calcium lactate molecule prior to dissociation. FIG. 5B is a visual representation of the calcium lactate molecule that dissociates into three parts—two symmetrical parts 1010 and 1030 and a central atom calcium atom 1020. Water surrounds each of the symmetrical parts and the central atom to form polygons according to the electronegativity of the molecule.

Micronutrients play key roles in intracellular behavior in both the innate (involved in all levels of immune response) and adaptive (when there is a serious infection) immune systems. In physiological systems, innate immunity activates adaptive response levels. For this reason, a group of minerals identified as key to the proper functioning of the immune system are included in the aqueous formulation of this invention for incorporation into the body through their intake.

The incorporation of these minerals into the body must be done in a carrier medium in solution that allows effective absorption. The elemental forms of these compounds, due to their chemical stability, will not allow for adequate absorption in the body, and it is highly likely that they will be discarded or not absorbed through the desired mechanisms if included in their elemental form. For this reason, salts with a high water solubility and having ionic valence values in solution that allow for natural absorption into physiological systems through physical mechanisms were selected for this invention.

In selecting suitable nutrients, it is necessary to review the stability of the solution that includes such nutrients, and assess any reactions that could occur with the dissolved salts to confirm that any species that could potentially create health risks are not generated. For this analysis, the chemical stability of the additives incorporated into the water were evaluated based on: (1.) dissolution properties; and (2.) adverse reactions. Based on such analysis, the selected nutrients for the aqueous beverage of this invention include calcium (Ca), magnesium (Mg), zinc (Zn), iron (Fe), copper (Cu) and selenium (Se), which are added as salts of water-soluble derivatives as shown in Table 1:

TABLE 1

| ANIONS | | CATIONS | |
|---|---|---|---|
| (ionic concentration in mol/L of solution) | | | |
| 1 LACTATE (−1) 8.77E−03 | (structure of lactate: O=C(O⁻)–CH(OH)–CH₃) | 1 CALCIUM (+2) 2.69E−03 | Ca (+2) |
| | | 2 MAGNESIUM (+2) | Mg (+2) |

TABLE 1-continued (ionic concentration in mol/L of solution)

| ANIONS | | | CATIONS | |
|---|---|---|---|---|
| | | | 1.61E−03 | |
| 2 SULFATE (−2) 5.58E−05 | 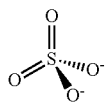 | 3 | ZINC (+2) 5.45E−05 | Zn (+2) |
| | | 4 | IRON (+2) 9.25E−05 | Fe (+2) |
| 3 SELENITE (−2) 5.75E−07 | 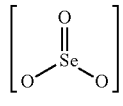 | 5 | COPPER (+2) 1.28E−06 | Cu (+2) |
| | | 6 | SODIUM (+1) 1.15E−06 | Na (+1) |

Interaction of Chemical Species

All the ions present in the solution can chemically interact with each other leading to the formation of other compounds or can present adverse reactions due to the chemical decomposition of solutes. Given the amount of salts dissolved along with some mineral species, which are typical present in a water source, there could be a significant amount of chemical reactions. However, many of these do not necessarily lead to toxic compounds or to compounds that can degrade the chemical nature of water.

To identify the reactions that can be obtained, the selectivity of the reactive ions were analyzed. All these mineral compounds have high solubilities that increase the likelihood of dissociative reactions when added to water. Chemical dissociation is a general process in which complexes, molecules and/or salts are separated into smaller molecules, ions or radicals, usually reversibly. Dissociation is the opposite of association, chemical synthesis or recombination. When a Brønsted-Lowry acid is put into water, a covalent bond between an electronegative atom and a hydrogen atom is broken by heterolytic fission, giving a proton and a negative ion. Dissociation into salts by solvation in a solvent such as water means the separation of a salt into its constituent anions and cations, each of which is surrounded by water molecules.

The high dipole moment of water and its ease of forming hydrogen bonds make water an excellent solvent. An ion is soluble in water if it can interact with the molecules through hydrogen bonds or through ion-dipole interactions. Anions that have oxygen atoms ($CO_3^{2-}$, $SO_4^{2-}$, $NO^-$, and the like) can form hydrogen bonds, because oxygen acts as a receiver of the hydrogen bonds and the anions are attracted to the water dipole. Likewise, $Cl^-$ or $F^-$, which have pairs of solitary electrons can act as hydrogen bridge receivers. On the other hand, cations such as $Na^+$, $K^+$, $Ca^{2+}$ or $Mg^{2+}$ when surrounded by water molecules can bind to the water molecules through dipole-like ion interactions, and the oxygen atoms are oriented towards the cation.

The dissolution reactions of the solutes in the water forms a chemical equilibrium in which the concentration of the solutes will depend on the concentration of the chemical species that dissociate. The concentration of any of the dissociated components, as well any other chemicals that contain similar components, will cause an increase in the amount of associations. This result is a consequence of Le Chatelier's Principle (the equilibrium reaction of association/dissociation), which is commonly seen as an effect on the solubility of salts and other weak electrolytes. Adding an amount of one of these salt ions usually leads to an increase in salt precipitation that reduces the concentration of salt ions until the solubility is balanced, because the original salt and the added chemical have an ion in common.

In other words, the solubility and chemical interaction of species in water is based on the solubility product ($K_{sol}$) wherein, by decreasing the solubility of a salt, one of the ions is added. As the concentration of one of the ions increases precipitation, the concentration of the other ions decreases, and therefore the $K_{sol}$ remains constant at a certain temperature. This effect reduces the solubility of many precipitates, or quantitatively precipitates an ion, by using an excess of precipitating agent. In this case, the presence of solutes with common ions such as lactates, for example in the form of calcium, magnesium and ferrous lactate, along with sulfates, for example in the form of zinc and copper sulfates, causes a chemical balance between these salts due to the common anions, which causes calcium lactate and zinc sulfate that are present in higher concentrations to decrease the solubility of the other salts. However, this effect can be counteracted by the increased solubility of magnesium lactate ($C_6H_{10}MgO6·2H_2O$), and including the $Fe^{2+}$ and $Cu^{2+}$ salts in low concentrations.

Thermal Stability of Chemical Species

Solutes dissolved in water are derived from salts that are considered stable under the operating conditions of the dilution system. There are several types of stability such as the thermodynamic state of the species or its potential for reactivity. Thermal stability is also related to the degradation of species potential as a function of temperature. The dilution system is thermo-regulated at a temperature of 4° C. and the variation in the temperature of the species varies until the absorption temperature of the organism up to about 37° C. This temperature variation is insufficient to cause a degradation of each chemical species, especially when it is diluted.

Chemical Stability of Solutes

In order to determine the potential for decomposition of chemical species, a series of reactions are posed to determine the feasibility of degradation of these solutes. Normally, the reaction for forming lactates includes the formation of carbonates of the metal to be incorporated, allowing the formation of water and carbon dioxide. Likewise, the feasibility of the degradation of these compounds to the formation of their respective acids according to the following exemplary reactions is determined:

Reaction (1)

a.

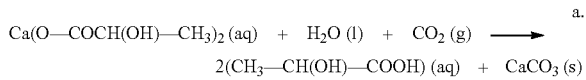

Ca(O—COCH(OH)—CH$_3$)$_2$ (aq) + H$_2$O (l) + CO$_2$ (g) ⟶ 2(CH$_3$—CH(OH)—COOH) (aq) + CaCO$_3$ (s)

Reaction (2)

b.

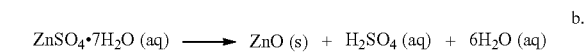

ZnSO$_4$·7H$_2$O (aq) ⟶ ZnO (s) + H$_2$SO$_4$ (aq) + 6H$_2$O (aq)

Reaction (3)

c.

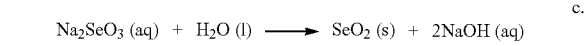

Na$_2$SeO$_3$ (aq) + H$_2$O (l) ⟶ SeO$_2$ (s) + 2NaOH (aq)

Reaction (4)

d.

CuSO$_4$ (aq) ⟶ CuO (s) + SO$_3$ (s)

The change in the Gibbs free energy (ΔG) according to Equation 1 for each process was calculated to determine the spontaneity or degree of feasibility of their occurrence:

$$\Delta G = \Delta H - T\Delta S \qquad \text{Equation 1}$$

where:

ΔG is the change in Gibbs free energy;

ΔH is the change in the enthalpy of the system;

T is the system temperature; and

ΔS is the change in the entropy of the process.

Although the temperature of the water is 4° C. during the structuration process (which is described in the co-pending application), the temperature of the water may increase during storage and consumption to reach the ambient temperature or internal temperature of the consumer. Thus, calculations were carried out at normal conditions. If the corresponding changes in Gibbs free energy is a negative change, the reaction will be expected to take place spontaneously at the normal temperature of 25° C. and unwanted chemical species will be formed in the solution. On the other hand, if the Gibbs free energy change is positive, the analyzed reaction will not take place spontaneously. Enthalpy is the average energy that is exchanged with the environment at constant pressure conditions in this process. A positive change in the enthalpy of the reaction indicates that the reaction is endothermic, and additional energy will be required to carry out the reaction. On the other hand, a negative change in the enthalpy of the reaction indicates that it releases energy, and the reaction is exothermic. The heats of formation and free energies of formation of exemplary compounds are shown in Table 2.

TABLE 2

| Component | ΔH formation @ 25° C. kCal/mol | ΔG formation @ 25° C. kCal/mol |
|---|---|---|
| $CuSO4$ (ac) | −200.78 | −160.19 |
| $CuO$ (s) | −38.5 | −31.9 |
| $H_2O$ (l) | −68.317 | −56.69 |
| $CO_2$ (g) | −94.05 | −94.26 |
| $Na_2SeO_3$ (ac) | −264.1 | −241.58 |
| $SeO_2$ (s) | −56.33 | −45 |
| $NaOH$ (ac) | −112.193 | −100.18 |
| $OS_3$ (s) | −105.9 | −88.34 |
| $H_2SO_{4\ (ac)}$ | −212.03 | −186 |
| $ZnSO_4$ (ac) | −233.8 | −208.31 |
| $ZnO$(s) | −83.17 | −76.05 |
| $CaCO_{3(s)}$ | −289.5 | −270.6 |
| $CH_3-CH(OH)-COOH$(ac) | −165.78 | −78 |
| $Ca\ (O-COCH(OH)-CH_3)_{2\ (AC)}$ | −108 | −280 |

Based on the values in Table 2, the reaction enthalpy and the Gibbs free energies were calculated, and the degree of spontaneity for each of the above reactions are shown in Table 3.

TABLE 3

| Calculation of spontaneity of reactions | ΔHR_x | ΔGR_x |
|---|---|---|
| Reaction (1) | −350.693 | 4.35 |
| Reaction (2) | −471.302 | 2.95 |
| Reaction (3) | 51.701 | 52.91 |
| Reaction (4) | 56.38 | 39.95 |

As can be seen from Table 3, reactions (1) and (2) are exothermic, and reactions (3) and (4) require additional energy to take place. It is also evident from these results that unwanted chemical species such as lactic acid, sulfuric acid, sodium hydroxide and some oxides (such as copper and sulfur oxides) will not be formed spontaneously in the solution.

The aqueous formulation of this application have the following features: all chemical species are soluble in water at dilution conditions and their concentration is enough to not affect the dissociation balance of the other species in the mixture; the metal ions dissolved in water will form ion-dipole interactions, which will orient the hydroxyl ions based on their negative charge, allowing greater stability of the chemical species in the solution, and prevent their chemical decomposition; several of the chemical species analyzed could undergo thermal decomposition processes, however this will not occur given the conditions under which the beverage is stored, at temperatures at or below ambient temperature, before consumption of the beverage; compounds such as lactic acid, sulfuric acid, sodium hydroxide and copper and sulfur oxides will not be formed as a product of side reactions between the dissolved salts.

Mechanism of Structuration Process

The formation of the three-dimensional helical cage structure of polygonal water molecules of this invention, where adjacent water molecules are connected by hydrogen bridging, based on the energy generated in the cavitation and implosion processes are described in detail in the co-pending application. The system for implementing the structuration process is also described in the co-pending application.

Figure 6A:
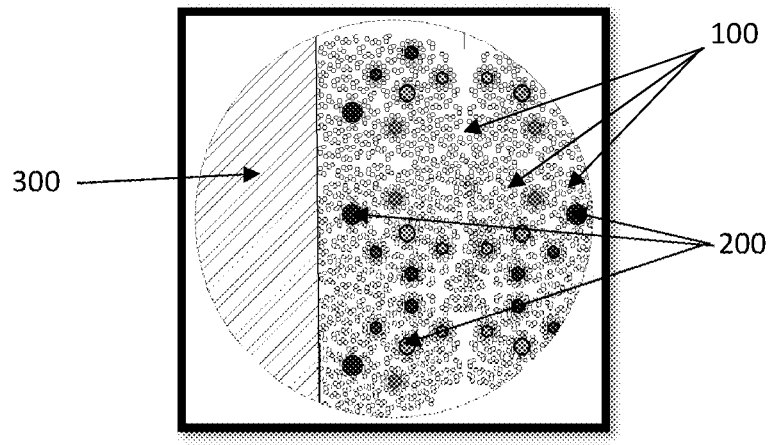
FIGS. 6A to 6C are illustrations representing the three phases during the structuration process of this invention.
Figure 6B:
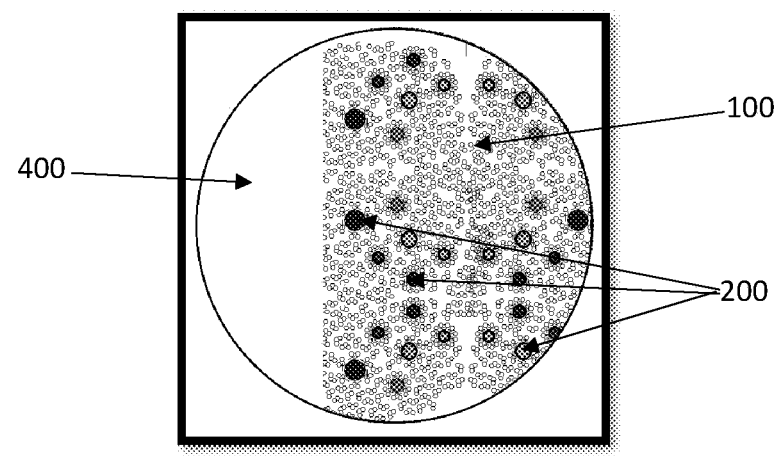
Figure 6C:
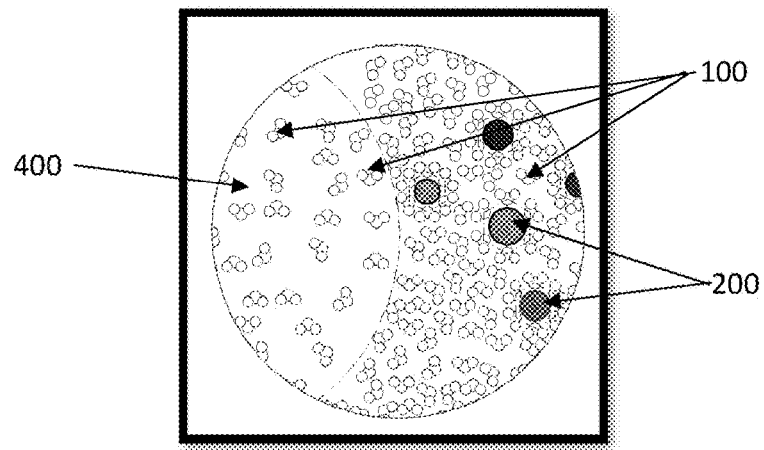

The structuration process can be summarized in three phases, as described here with reference to FIGS. 6A to 6C.

Phase 1. Energy transfer from solid to fluid, where the solid body of high kinetic energy forms a pressure difference on the working fluid that already has a predefined structure due to the contained minerals, and has high kinetic energy. FIG. 6A is an illustration of a high kinetic energy solid, which forms a pressure difference on the working fluid that already has a predefined structure due to the minerals contained in the water. This high kinetic energy solid has high kinetic energy in addition to the internal energy of the fluid. As shown in FIG. 6A, water molecules 100 and mineral atoms 200, for example, calcium, magnesium, iron, zinc, copper, selenium, and the like, dispersed within the water molecules come into contact with the solid body of high kinetic energy 300. The high kinetic energy solid 300 is responsible for providing the kinetic energy to the fluid and providing space for the formation of the cavitation and implosion process.

Phase 2. Vacuum pressure, bubble formation, where the solid body of high kinetic energy is removed to create a zone of high vacuum and, due to the thermodynamic properties of water, the water is violently converted from the liquid to the gaseous phase, and this conversion generates a high amount of energy.

Phase 3. The implosion process begins just after the high kinetic energy solid 300 leaves a volume delimited by its geometrical shape, generating a vacuum pressure on the system. In this process, energy is transferred violently and concentrically at various locations because of the creation of a vacuum in the area vacated by the high kinetic energy solid 300. This process occurs at a local pressure of about 100 MPa and a temperature of about 5000 K, which are generated within the water during the cavitation and implosion processes.

FIGS. 6B and 6C are illustrations of the two zones formed when the removal of the solid body creates a vacuum in collapse zone 400, and the layer of water molecules 100 closest to the collapse zone 400 changes its phase and becomes a gas, which in turn, raises the temperature of the fluid.

EXAMPLES

The principles of the present invention, as well as certain exemplary features and embodiments thereof, will now be described by reference to the following non-limiting examples.

The system for the preparation of the beverage compositions of the examples described herein are described in the co-pending application, the disclosures of which are incorporated as if fully set forth herein. As described in the co-pending application, the water dispensing system described therein creates the structured water of this invention and dispenses an aqueous beverage including the structured water with molecular hydrogen and minerals dissolved therein. The minerals and additives are added from a mineralizer to the system prior to the structuration process, as described in the co-pending application, in the amounts described in Examples 1 to 4 (Tables 4 to 7) below.

In addition, the aqueous beverage includes dissolved hydrogen. The dissolved hydrogen in the structured water is obtained from a mineral reactor (or MgPLUS unit), a gas supply, or any other available source of gaseous hydrogen, as described in the co-pending application. For example, the hydrogen dissolved in the aqueous beverage of this invention can be added to the water dispensing system from one or more of the mineral reactor (or MgPLUS unit), the gas supply, or any other available source of gaseous hydrogen in any reasonable amount thereof. As described in the co-pending application, the gas supply may include means, structures or devices for producing (e.g., hydrogen generation cells, Proton Exchange Membrane (PEM) Cells) or separating gases, such as electrolysis or other processes, and means for gas storage, such as cylinders or pressurized tanks, and any combination thereof.

In an exemplary embodiment, about 50% of the hydrogen added to the water dispensing system is generated by the mineral reactor (or MgPLUS unit) and a remaining 50% of the hydrogen added to the water dispensing system is generated by a hydrogen generation cell or the gas supply. An additional amount of hydrogen can also be added to the water dispensing system, for example, in an amount of about 20%, from a hydrogen storage to sustain the final amount of dissolved hydrogen in the aqueous beverage. For example, for a final concentration of about 6 mg/L of hydrogen in the aqueous beverage of this invention, 3 mg/L of hydrogen may be generated by the mineral reactor (or MgPLUS unit) and 3 mg/L of hydrogen may be generated by the hydrogen generation cell or the gas supply. In another embodiment, an additional 1.0 to 2.0 mg/L of hydrogen may be added to the water dispensing system from a hydrogen storage. However, these amounts are not limited and the hydrogen can be added to the water dispensing system in any combination of amounts from the different hydrogen sources.

Example 1

In a first exemplary embodiment, the components listed in Table 4 are added to the water dispensing system described in the co-pending application in the listed amounts before the structuration process.

TABLE 4

| Component | Concentration (mg/$L_{H2O}$) |
| --- | --- |
| Calcium lactate pentahydrate ($C_6H_{10}O_6Ca \cdot 5H_2O$) | 586 |
| Magnesium lactate dihydrate ($C_6H_{10}MgO_6 \cdot 2H_2O$) | 325.8 |
| Zinc sulphate ($ZnSO_4$) | 8.8 |
| Ferrous Lactate Trihydrate ($C_6H_{10}FeO_6 \cdot 3H_2O$) | 24.6 |
| Copper sulphate II (+2) pentahydrate ($CuSO_4 \cdot 5H_2O$) | 0.2 |
| Sodium selenite ($Na_2SeO_3$) | 0.1 |

Example 2

In a second exemplary embodiment, the components listed in Table 5 are added to the water dispensing system described in the co-pending application in the listed amounts before the structuration process.

TABLE 5

| Component | Concentration (mg/$L_{H2O}$) |
| --- | --- |
| Calcium lactate | 586 |
| Magnesium lactate | 325 |
| Iron (II) lactate | 5 |
| Zinc sulfate ($ZnSO_4$) | 5 |
| Copper (II) sulfate ($CuSO_4$) | 0.2 |
| Sodium selenite ($Na_2SeO_3$) | 0.01 |
| Citric acid | 12 |
| β-Hydroxy beta-methylbutyric acid (HMB) | 3,000 |
| L-citrulline | 2,500 |
| L-glutamine | 2,500 |
| Riboflavin (Vitamin $B_2$) | 20 |
| Biotin (Vitamin $B_7$) | 0.9 |
| Pyridoxine (Vitamin $B_6$) | 80 |
| Folate, (Vitamin $B_9$) | 0.9 |
| Thiamine (Vitamin $B_1$) | 1.4 |

Example 3

In a third exemplary embodiment, the components listed in Table 6 are added to the water dispensing system as described in the co-pending application in the listed amounts before the structuration process.

TABLE 6

| Component | Concentration (mg/$L_{H2O}$) |
| --- | --- |
| Calcium lactate | 250 |
| Magnesium lactate | 325 |
| Iron (II) lactate | 5 |
| Zinc sulfate (ZnSO4) | 5 |
| Copper (II) sulfate (CuSO4) | 0.2 |
| Sodium selenite ($Na_2SeO_3$) | 0.01 |
| B-alanine | 5,000 |
| L-theanine | 100 |
| Cobalamine (vitamin $B_{12}$) | 0.05 |

Example 4

In a fourth exemplary embodiment, the components listed in Table 7 are added to the water dispensing system as described in the co-pending application in the listed amounts before the structuration process.

TABLE 7

| Component | Concentration (mg/L$_{H2O}$) |
|---|---|
| Calcium lactate pentahydrate | 4508 |
| Magnesium lactate dihydrate | 3189 |
| Iron (II) lactate | 20.950 |
| Zinc sulfate (ZnSO$_4$) | 12.349 |
| Copper (II) sulfate (CuSO4•5H$_2$O) | 0.786 |
| Sodium selenite (Na$_2$SeO$_3$) | 0.022 |

Experimental Example

Figure 7:
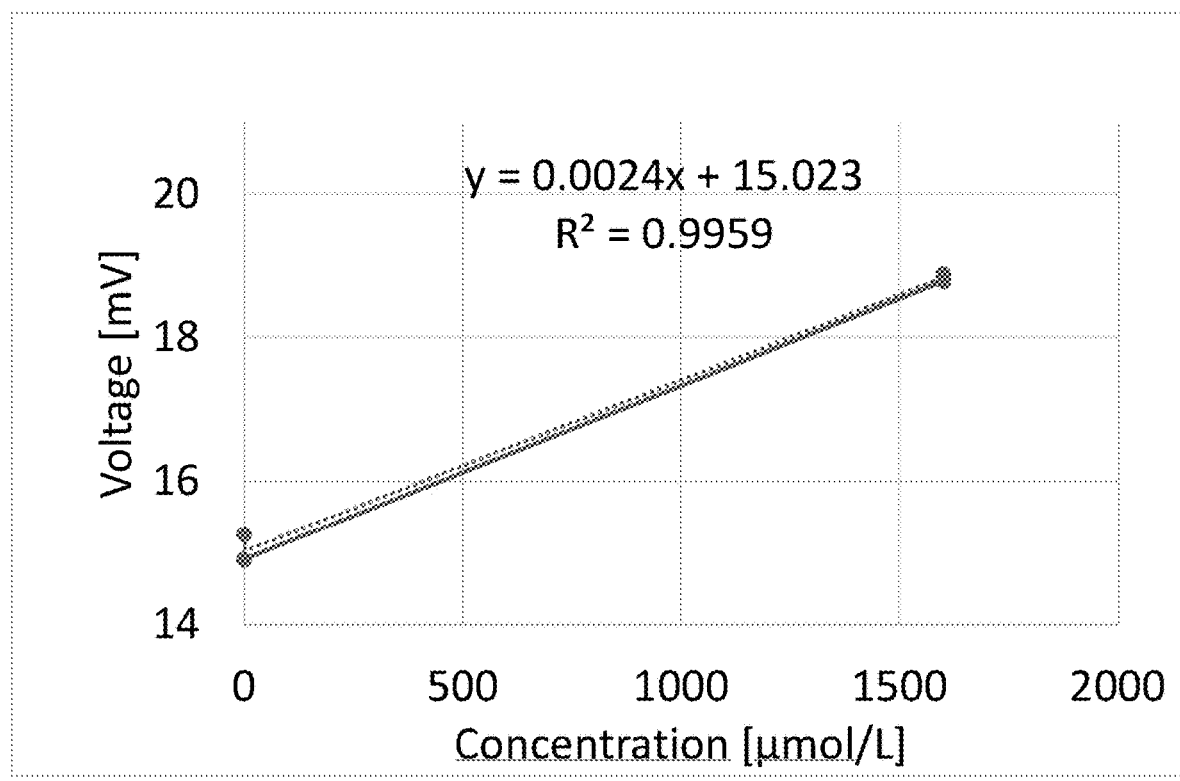
FIG. 7 is a calibration curve used in the measurement of dissolved hydrogen concentration of the working Examples of this application.

A Clark-type electrode was used to measure the amount of dissolved hydrogen in the aqueous beverage of this application. The Clark-type sensor electrode includes an electrochemical system of two electrodes—a reference electrode and a sensor anode, and the sensor is connected to a high sensitivity pico-ammeter where the anode is polarized against the internal reference. Driven by the external partial pressure, hydrogen dissolved in the beverage passes through the sensor tip membrane and oxidizes on the surface of the sensor anode. The pico-ammeter converts the resulting oxidation current into an electrical signal. The electrode is calibrated in reverse osmosis water according to the procedures required by the specific sensor, and then immersed in the aqueous beverage to measure the concentration of dissolved hydrogen. A calibration curve used to calculate the concentration of dissolved hydrogen as a function of the voltage reading of the Clark-type electrode used in the examples described herein is shown in FIG. 7.

To measure the concentration of dissolved hydrogen, the beverage of Example 4 was collected in a 900 ml bottle, and the bottle was then closed by hand. The closed bottle was sealed at room temperature (about 15° C.) and normal atmospheric pressure (about 75 kPa). The closed bottles were opened at various times, and transferred to a suitable container for measurement of the dissolved hydrogen concentration. The time between transfer to a suitable container and measurement of the dissolved hydrogen concentration was less than 5.0 seconds.

The results of the above-described measurements on the beverage of Example 4 are shown in Tables 8-10.

Table 8 shows the change in hydrogen concentration as a function of time. As shown by the results in Table 8, the dissolved hydrogen concentration is the highest at a temperature of 4° C. The concentration of the dissolved hydrogen is dependent on temperature, and decreases with an increase in the storage temperature.

TABLE 8

| Storage Temperature (° C.) | Signal (mV) | Dissolved H$_2$ Concentration (mg/L$_{H2O}$) |
|---|---|---|
| 4 | 14.59 | 6.09 |
| 8 | 24.78 | 4.68 |
| 10 | 41.44 | 1.01 |
| 16 | 47.46 | 1.05 |
| 18 | 48.32 | 1.21 |
| 20 | 50.23 | 1.56 |

Table 9 lists the dissolved hydrogen concentration as measured at 18° C. and 72 hours after collecting and bottling the water in a plastic container. Conventionally, the equilibrium concentration (saturation) of hydrogen gas in water at a partial pressure of one atm is 1.57 mg/L. However, the dissolved hydrogen escapes the water and hydrogen is not retained at this concentration over time in conventional beverages. In comparison, as shown in Table 9, the amount of dissolved hydrogen is maintained even after 72 hours of storage. This is an unexpected and superior property of the aqueous beverage of this invention, where the retention of dissolved hydrogen in water is possible because of the presence of the three-dimensional helical cage structure (structured water) in the aqueous beverage of this invention.

TABLE 9

| Storage Time (hour) | Temperature (° C.) | Signal (mV) | Dissolved H$_2$ Concentration (mg/L$_{H2O}$) |
|---|---|---|---|
| 72 | 18 | 14.59 | 1.60 |
| 72 | 18 | 14.01 | 1.53 |
| 72 | 18 | 14.19 | 1.55 |
| Average values | | 14.26 | 1.56 |

Table 10 lists the dissolved hydrogen concentration over time. In this example, the water was collected from the water dispensing system and bottled in a glass container. As seen in Table 10, the dissolved hydrogen concentration is highest at 168 hours (7 days) after bottling, and decreases over time. However, even after 2,016 hours (84 days) after bottling, the dissolved hydrogen concentration is at 1.65 mg/L$_{H2O}$, which is higher than the equilibrium (saturation) concentration (1.57 mg/L) of hydrogen gas in water at a partial pressure of one atm. The results in Table 10 also show that when the structured water dispensed from the water dispensing system is collected and stored in a glass bottle, the concentration of dissolved hydrogen is significantly higher (3.46 mg/L) compared to the concentration of dissolved hydrogen in water that is collected and bottled in a plastic container (1.56 mg/L). This can be attributed to the different porosity of glass and plastic bottles. Glass having lower porosity is able to retain the dissolved concentration within the container at a higher amount than plastic.

TABLE 10

| | Time (hours/days) | Temperature (° C.) | Signal (mV) | Dissolved H$_2$ Concentration (mg/L$_{H2O}$) |
|---|---|---|---|---|
| Experimental Example | 168/7 | 11 | 41.44 | 3.46 |
| | 336/14 | 15 | 23.36 | 2.00 |
| | 672/28* | 20 | 5.45 | 0.55 |
| | 2,016/84 | 20 | 0.21 | 1.65 |
| Ref. PEM Cell | 0.30/0.0125 | 20 | 4.12 | 0.52 |

*The outlier data point at 28 days can be attributed to a difference in the closing torques of the cap, and is thus, not included in determining stability trends of the aqueous beverage of this invention.

These results also demonstrate the unexpected and superior properties, including long term stability of the aqueous beverage composition described herein, which includes a three-dimensional helical cage structure of polygonal water molecules, where the polygonal water molecules comprise two or more adjacent water molecules connected by hydrogen bridges, and the three-dimensional helical cage structure has a central hollow lumen (channel) that includes dissolved hydrogen, minerals and additives within the hollow lumen. The high concentration of dissolved hydrogen, as demonstrated by a concentration of 3.46 mg/L$_{H2O}$ at 7 days after bottling, and the long term stability of the dissolved hydrogen, as demonstrated by a higher concentration of dissolved hydrogen at day 84 (Table 10) compared to day 3 (Table 3), is due to the presence of the dissolved hydrogen molecules in the hollow lumen of the three-dimensional helical cage structure of the structured water of this invention, and the minerals and additives also included therein.

As various changes could be made in the above methods and compositions without departing from the scope of the invention, it is intended that all matter contained in the above description shall be interpreted as illustrative and not in a limiting sense. Any numbers expressing quantities of ingredients, constituents, reaction conditions, and so forth used in the specification are to be interpreted as encompassing the exact numerical values identified herein, as well as being modified in all instances by the term "about." Notwithstanding that the numerical ranges and parameters setting forth, the broad scope of the subject matter presented herein are approximations, the numerical values set forth are indicated as precisely as possible. Any numerical value, however, may inherently contain certain errors or inaccuracies as evident from the standard deviation found in their respective measurement techniques. None of the features recited herein should be interpreted as invoking 35 U.S.C. § 112, paragraph 6, unless the term "means" is explicitly used.

What is claimed is:

1. An aqueous beverage composition, comprising:
   a structured water comprising multiple water molecules in a planar orientation where adjacent water molecules are joined by hydrogen bridges forming hexagonal rings of water molecules forming a plane of a two-dimensionally ordered hexagonal matrix arrangement of water molecules, which is replicated in a plurality of planes stacked in a direction perpendicular to the plane of the of two-dimensionally ordered hexagonal matrix arrangement and connected via hydrogen bridges to form multiple layers of the two-dimensionally ordered hexagonal matrix arrangement, forming a plurality of three-dimensional helical cage structures of polygonal water molecules, wherein each of the helical cage structures has a central hollow lumen, and when viewed from a top, each of the helical cage structures has a hexagonal shape;
   molecular hydrogen dissolved in the structured water, the molecular hydrogen located within the central hollow lumen of one or more of the helical cage structures of the structured water; and
   at least one additive dissolved in the structured water, the at least one additive located within the central hollow lumen of one or more of the helical cage structures of the structured water,
   wherein the dissolved molecular hydrogen at a concentration of about 0.5 mg/L to 10 mg/L is retained in the aqueous formulation for a period of 7 days to about 6 months.

2. The aqueous beverage composition of claim 1, wherein the at least one additive is selected from the group consisting of calcium, magnesium, iron, zinc, copper, selenium, folic acid, citric acid, thiamine, theanine, vitamin B1, vitamin B2, vitamin B6, vitamin B7, alanine, valine, isoleucine, citrulline, glutamine, hydroxymethylbutyrate, and salts and derivatives thereof.

3. The aqueous beverage composition of claim 1, wherein the at least one additive comprises at least one of calcium lactate, magnesium lactate, iron (II) lactate, zinc sulfate, copper sulfate, sodium selenite, folic acid, citric acid, hydroxymethylbutyric acid, citrulline, glutamine, alanine, theanine, vitamin B1, vitamin B2, vitamin B6, vitamin B7, and vitamin B12.

4. The aqueous beverage composition of claim 3, wherein the at least one additive comprises calcium lactate, magnesium lactate, iron (II) lactate, zinc sulfate, copper sulfate, sodium selenite, folic acid, citric acid, hydroxymethylbutyric acid, citrulline, glutamine, vitamin B1, vitamin B2, vitamin B6, and vitamin B7.

5. The aqueous beverage composition of claim 4, wherein:
   a concentration of calcium lactate is about 100 mg/L to about 8200 mg/L;
   a concentration of magnesium lactate is about 40 mg/L to about 5800 mg/L;
   a concentration of iron (II) lactate is about 1 mg/L to about 40 mg/L;
   a concentration of zinc sulfate is about 1 mg/L to about 20 mg/L;
   a concentration of copper sulfate is about 0.1 mg/L to about 2 mg/L;
   a concentration of sodium selenite is about 0.01 mg/L to about 0.1 mg/L;
   a concentration of folic acid is about 0.1 mg/L to about 10 mg/L;
   a concentration of citric acid is about 1 mg/L to about 50 mg/L;
   a concentration of hydroxymethylbutyric acid is about 500 mg/L to about 5000 mg/L;
   a concentration of citrulline is about 500 mg/L to about 5000 mg/L;
   a concentration of glutamine is about 500 mg/L to about 5000 mg/L;
   a concentration of vitamin B1 is about 0.1 mg/L to about 5 mg/L;
   a concentration of vitamin B2 is about 1 mg/L to about 100 mg/L;
   a concentration of vitamin B6 is about 10 mg/L to about 200 mg/L; and
   a concentration of vitamin B7 is about 0.01 mg/L to about 10 mg/L.

6. The aqueous beverage composition of claim 3, wherein the at least one additive comprises magnesium lactate, iron (II) lactate, zinc sulfate, copper sulfate, sodium selenite, alanine, theanine, and vitamin B12.

7. The aqueous beverage composition of claim 6, wherein:
   a concentration of magnesium lactate is about 40 mg/L to about 5800 mg/L;
   a concentration of iron (II) lactate is about 1 mg/L to about 40 mg/L;
   a concentration of zinc sulfate is about 1 mg/L to about 20 mg/L;
   a concentration of copper sulfate is about 0.1 mg/L to about 2 mg/L;
   a concentration of sodium selenite is about 0.01 mg/L to about 0.1 mg/L;
   a concentration of alanine is about 500 mg/L to about 10,000 mg/L;
   a concentration of theanine is about 10 mg/L to about 500 mg/L; and
   a concentration of vitamin B12 is about 0.001 mg/L to about 1 mg/L.

8. The aqueous beverage composition of claim 1, wherein the at least one additive comprises calcium lactate, magnesium lactate, zinc sulfate, vitamin B6, sodium selenite, and theanine.

* * * * *